(12) United States Patent
Funahashi

(10) Patent No.: US 7,315,633 B2
(45) Date of Patent: Jan. 1, 2008

(54) FINGERPRINT PROCESSING APPARATUS, FINGERPRINT PROCESSING METHOD, RECORDING MEDIUM AND PROGRAM

(75) Inventor: Takeshi Funahashi, Saitama (JP)

(73) Assignee: Sony Corporation, Tokyo (JP)

( * ) Notice: Subject to any disclaimer, the term of this patent is extended or adjusted under 35 U.S.C. 154(b) by 715 days.

(21) Appl. No.: 10/701,314

(22) Filed: Nov. 4, 2003

(65) Prior Publication Data

US 2004/0096087 A1 May 20, 2004

(30) Foreign Application Priority Data

Nov. 7, 2002 (JP) ............................ P2002-324146

(51) Int. Cl.
*G06K 9/00* (2006.01)
(52) U.S. Cl. ...................... 382/124; 382/228
(58) Field of Classification Search ................ 382/124, 382/126, 228
See application file for complete search history.

(56) References Cited

U.S. PATENT DOCUMENTS

| | | | | |
|---|---|---|---|---|
| 4,007,440 | A | * | 2/1977 | Kono et al. .................. 382/206 |
| 5,963,656 | A | * | 10/1999 | Bolle et al. .................. 382/124 |
| 5,995,642 | A | * | 11/1999 | Hsu et al. .................... 382/124 |
| 6,320,981 | B1 | * | 11/2001 | Yada ........................... 382/168 |
| 6,597,802 | B1 | * | 7/2003 | Bolle et al. .................. 382/124 |

FOREIGN PATENT DOCUMENTS

| JP | 55-030133 | 3/1980 |
|---|---|---|
| JP | 56-054759 | 5/1981 |
| JP | 02-234356 | 9/1990 |
| JP | 05-028992 | 2/1993 |
| JP | 06-260166 | 9/1994 |
| JP | 10-214621 | 8/1998 |
| JP | 11-086852 | 3/1999 |
| JP | 11-238509 | 8/1999 |

* cited by examiner

*Primary Examiner*—Matthew C. Bella
*Assistant Examiner*—Dennis Rosario
(74) *Attorney, Agent, or Firm*—Sonnenschein Nath & Rosenthal LLP

(57) ABSTRACT

Secure detection of a finger in contact with a sensor. A fingerprint collation program is proposed, in which data outputted from a fingerprint reading sensor is classified into predetermined patterns according to data of a maximum threshold value or more, data of a minimum threshold value or less and an amplitude constituted by a difference obtained based on the maximum and the minimum values of the outputted data. Such fingerprint collation program determines the object that is in contact with the sensor based on the classified patterns. For example, determines whether the object is a finger or not. The present invention may be applied to a fingerprint collation apparatus.

8 Claims, 31 Drawing Sheets

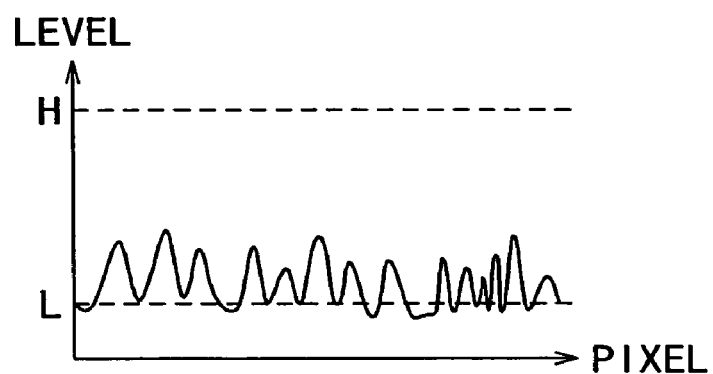
F I G. 10
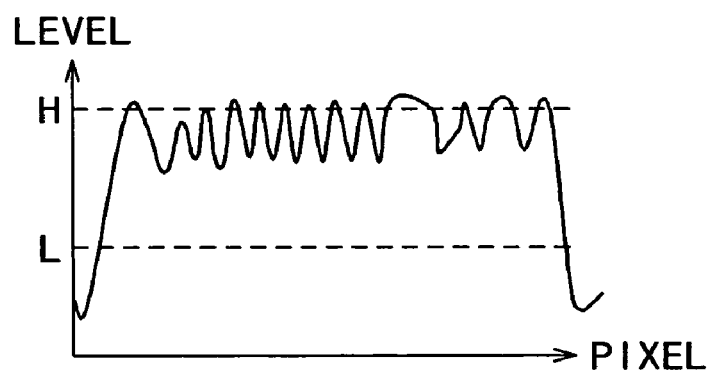
F I G. 11
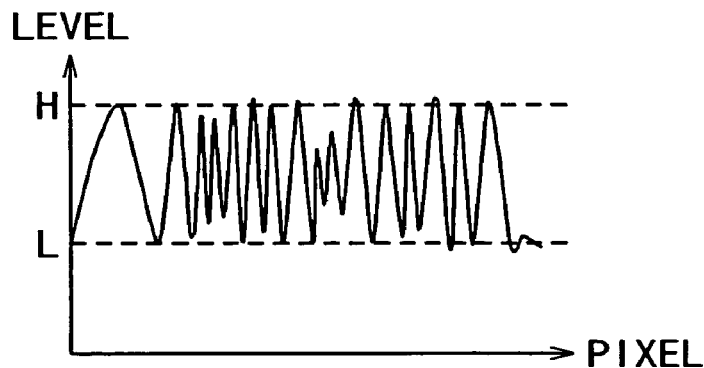
F I G. 12

F I G. 1 5
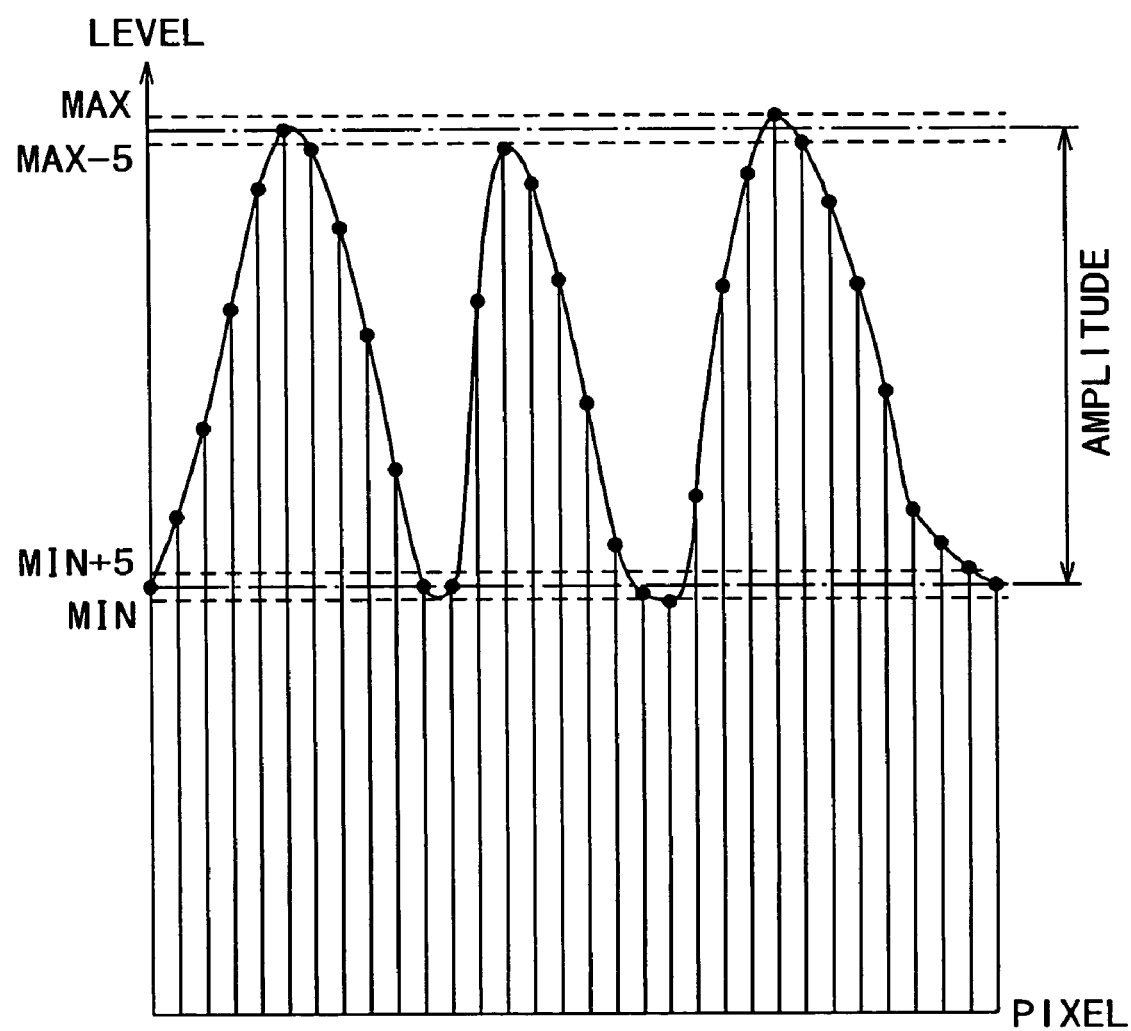

FIG. 16

| PATTERN NAME | H COUNT PARAMETER | L COUNT PARAMETER | AMPLITUDE PARAMETER |
|---|---|---|---|
| PATTERN 0 | 0 | 0 | 0 |
| PATTERN 1 | 0 | 0 | 1 |
| PATTERN 2 | 0 | 1 | 0 |
| PATTERN 3 | 0 | 1 | 1 |
| PATTERN 4 | 1 | 0 | 0 |
| PATTERN 5 | 1 | 0 | 1 |
| PATTERN 6 | 1 | 1 | 0 |
| PATTERN 7 | 1 | 1 | 1 |

FIG. 17

| PATTERN NAME | NUMBER OF PATTERNS | AVERAGE H COUNT (b2) | AVERAGE L COUNT (b1) | AVERAGE AMPLITUDE (b0) |
|---|---|---|---|---|
| PATTERN 0 | 0 | - | - | - |
| PATTERN 1 | 8 | 2 | 0 | 72 |
| PATTERN 2 | 1 | 0 | 887 | 36 |
| PATTERN 3 | 18 | 3 | 238 | 84 |
| PATTERN 4 | 0 | - | - | - |
| PATTERN 5 | 149 | 372 | 1 | 81 |
| PATTERN 6 | 0 | - | - | - |
| PATTERN 7 | 81 | 149 | 95 | 88 |

FIG. 19

| $x_1$ | $x_2$ | $x_3$ |
|---|---|---|
| $x_4$ | $x_5$ | $x_6$ |
| $x_7$ | $x_8$ | $x_9$ |

FIG. 25

| | REGISTERED DATA | POSITION INFORMATION |
|---|---|---|
| USER ID | HORIZONTAL DIRECTION REGISTERED DATA D1H0 | X0, Y0 |
| | HORIZONTAL DIRECTION REGISTERED DATA D1H1 | X0, Y1 |
| | ⋮ | ⋮ |
| | HORIZONTAL DIRECTION REGISTERED DATA D1H4 | X0, Y4 |
| | ⋮ | ⋮ |
| | HORIZONTAL DIRECTION REGISTERED DATA D1H8 | X0, Y8 |
| | VERTICAL DIRECTION REGISTERED DATA D1V0 | X0, Y0 |
| | VERTICAL DIRECTION REGISTERED DATA D1V1 | X1, Y0 |
| | ⋮ | ⋮ |
| | VERTICAL DIRECTION REGISTERED DATA D1V4 | X4, Y0 |
| | ⋮ | ⋮ |
| | VERTICAL DIRECTION REGISTERED DATA D1V8 | X8, Y0 |

FINGERPRINT PROCESSING APPARATUS, FINGERPRINT PROCESSING METHOD, RECORDING MEDIUM AND PROGRAM

CROSS REFERENCE TO RELATED APPLICATIONS

The present document is based on Japanese Priority Application JP2002-324146, filed in the Japanese Patent Office on Nov. 7, 2002, the contents of which being incorporated herein by reference to the extent permitted by law.

BACKGROUND OF THE INVENTION

1. Field of the Invention

The present invention relates to a signal processing apparatus, a signal processing method, a recording medium and a program, and more particularly, to a signal processing apparatus, a signal processing method, a recording medium and a program, which are useful for fingerprint collation.

2. Description of the Related Art

Nowadays there is technology for fingerprint collation by reading a user's fingerprint in order to carry out authentication for identification purposes.

Conditions for reading a fingerprint vary from user to user as well as with differences in environment. Users which are subject to fingerprint reading may include people that sweat easily, or conversely, those who hardly sweat. Further, reading the fingerprint of a user with cream or the like applied to one's hand sometimes causes a mark of fingerprint-shaped greasy stains to be left on the surface of the sensor.

In the conventional art, amplitude of an output signal from a sensor has been used to determine whether a finger is in contact with the sensor or not.

For instance, a conventional fingerprint collation apparatus starts fetching in a fingerprint image, after positioning of a finger is detected through a capacitance between a pair of electrodes mounted at a finger rest position (See, for instance, Japanese Patent Laid-open No. 11-197135).

SUMMARY OF THE INVENTION

However, conventional fingerprint collation apparatuses have presented the disadvantage of not being able to perform properly, i.e., determining that the finger is not in contact with the sensor, though being in contact with the sensor, or conversely, that the finger is in contact with the sensor, though not being in contact with the sensor.

The present invention has been conceived in view of the above problems, and is intended to make it possible to securely determine (judge) that a finger is in contact with a sensor.

According to a preferred embodiment of the present invention, there is provided a signal processing apparatus for processing data supplied from a sensor that outputs data of magnitude corresponding to respective capacitances of capacitors related to a plurality of sampling points formed by a touching object, the signal processing apparatus including: classifying means for classifying the data into patterns based on number of data having magnitude of a first threshold value or more, number of data having magnitude of a second threshold value or less and a difference between values obtained based on a maximum value and a minimum value of magnitude of the data; and determining means for determining the object touching the sensor, based on the classified patterns.

Preferably, the signal processing apparatus according to the preferred embodiment of the present invention has the determining means determines whether the object is a finger or not.

In addition, the signal processing apparatus according to the preferred embodiment of the present invention preferably has the first threshold value having a value corresponding to the capacitance of the capacitor relative to a convex portion of the detected finger.

Also, the signal processing apparatus according to the preferred embodiment of the present invention has the second threshold value having a value corresponding to the capacitance of the capacitor relative to a concave portion of the finger.

Furthermore, the signal processing apparatus according to the preferred embodiment of the present invention has preferably the difference comprising a value obtained by subtracting an average of the data within a second range having the minimum value of the data as a reference, from an average of the data within a first range having the maximum value of the data as a reference.

The signal processing apparatus according to the preferred embodiment of the present invention has the determining means in which the data corresponding to respective capacitances of the capacitors related to a plurality of sampling points within a range that includes a portion of a detection area of the sensor are classified into patterns.

Further, the signal processing apparatus according to the preferred embodiment of the present invention preferably has the classifying means classifying each of the ranges within a plurality of the ranges into the patterns; and the determining means determining the object touching the sensor based on the patterns classified for each of the ranges.

In addition, according to another preferred embodiment of the present invention, there is provided a signal processing method for processing data supplied from a sensor that outputs data of magnitude corresponding to respective capacitances of capacitors related to a plurality of sampling points formed by a touching object, the signal processing method including the steps of classifying the data into patterns based on number of data having magnitude of a first threshold value or more, number of data having magnitude of a second threshold value or less and a difference between values obtained based on a maximum value and a minimum value of magnitude of the data; and determining the object touching the sensor, based on the classified patterns.

Still, according to another preferred embodiment of the present invention, there is provided a storage medium for storing a computer-readable program for causing a computer to execute the steps of a signal processing method for processing data supplied from a sensor that outputs data of magnitude corresponding to respective capacitances of capacitors related to a plurality of sampling points formed by a touching object, the signal processing method including the steps of classifying the data into patterns based on number of data having magnitude of a first threshold value or more, number of data having magnitude of a second threshold value or less and a difference between values obtained based on a maximum value and a minimum value of magnitude of the data; and determining the object touching the sensor, based on the classified patterns.

Moreover, according to another preferred embodiment of the present invention, there is provided a computer-readable program for causing a computer to execute the steps of a signal processing method for processing data supplied from a sensor that outputs data of magnitude corresponding to respective capacitances of capacitors related to a plurality of sampling points formed by a touching object, the signal processing method including the steps of: classifying the data into patterns based on number of data having magnitude of a first threshold value or more, number of data having magnitude of a second threshold value or less and a difference between values obtained based on a maximum value and a minimum value of magnitude of the data; and determining the object touching the sensor, based on the classified patterns.

The method, the storage medium and the program according to the preferred embodiments of the present invention permit determine the object which is in contact with the sensor based on the predetermined classified patterns to which the data is classified, into patterns based on number of data having magnitude of a first threshold value or more, number of data having magnitude of a second threshold value or less and a difference between values obtained based on a maximum value and a minimum value of magnitude of the data.

According to the preferred embodiments of the present invention, it is possible to determine a contacting object, particularly, in order to effect fingerprint collation.

In addition, the preferred embodiments of the present invention may securely determine that the finger is in contact with the sensor.

BRIEF DESCRIPTION OF THE DRAWINGS

The features and advantages of the present invention will become more apparent in the following description of the presently preferred embodiments of the invention taken in conjunction with the accompanying drawings, in which:

FIG. 10 is a waveform diagram illustrating a different typical waveform of output from the fingerprint reading sensor 21;

FIG. 11 is a waveform diagram illustrating a different typical waveform of output from the fingerprint reading sensor 21;

FIG. 12 is a waveform diagram illustrating a different typical waveform of output from the fingerprint reading sensor 21;

FIG. 15 is a waveform diagram illustrating amplitude;

FIG. 16 is a schematic diagram illustrating patterns of output from the fingerprint reading sensor 21;

FIG. 17 is a schematic diagram illustrating results of actual measurements on the patterns of the output from the fingerprint reading sensor 21;

FIG. 19 is a schematic diagram illustrating a noted value and a difference between the noted value and each value adjoining thereto in a finger positioning detection process;

FIG. 25 is a schematic diagram illustrating contents of a flash memory 54 such as a user ID, nine lines of horizontal direction registered data D1H0 to D1H8 and nine lines of vertical direction registered data D1V0 to D1V8;

DETAILED DESCRIPTION OF THE PREFERRED EMBODIMENTS

Figure 1:
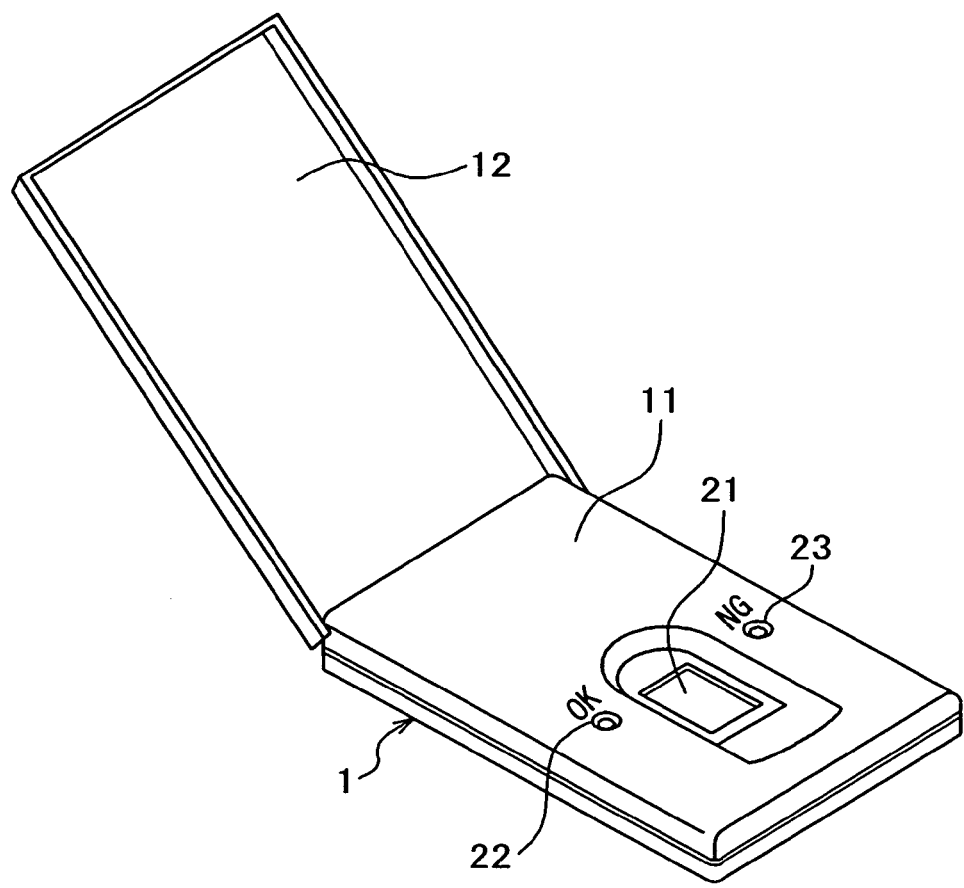
FIG. 1 is a perspective view showing an external appearance of a fingerprint collation apparatus, which represents a preferred embodiment according to the present invention.

FIG. 1 is a perspective view showing an external appearance of a fingerprint collation apparatus, according to a preferred embodiment of the present invention.

A fingerprint collation apparatus 1 according to a preferred embodiment of the present invention comprises a body part 11 composing an apparatus casing, and a protection cover 12 mounted to the body part 11 in a pivotally movable manner to protect physically an upper face of the body part 11 in a closed state. In FIG. 1, there is shown the fingerprint collation apparatus 1 with the protection cover 12 unfolded to the body part 11.

The body part 11 has on an upper face thereof a fingerprint reading sensor 21, and lamps 22 and 23 indicating that a condition in which the finger is in contact with the fingerprint reading sensor 21 is good or not, together with fingerprint collation results.

The fingerprint reading sensor 21 reads an image of the fingerprint of the finger that is pressing into contact with the fingerprint reading sensor 21. In addition, the fingerprint reading sensor 21 outputs a signal (signal used for determining whether an object in contact with the fingerprint reading sensor is the finger or not) in response to finger contact with the fingerprint reading sensor 21.

Figure 2:
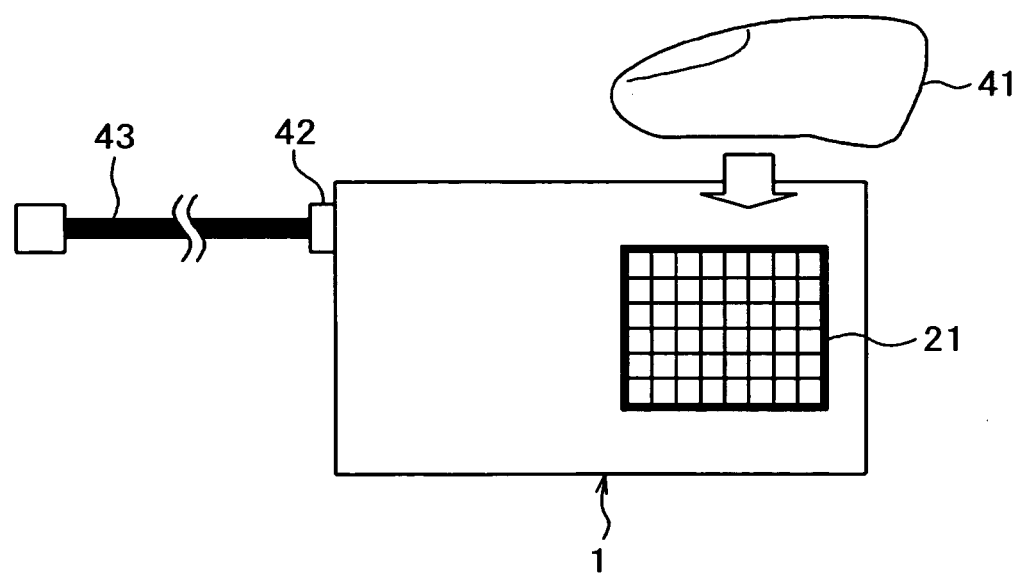
FIG. 2 is a schematic diagram illustrating a state in which a fingerprint reading sensor 21 is pressed with a finger 41 whose fingerprint is to be read.

In an unfolded state shown in FIG. 1, pressing the fingerprint reading sensor 21 lightly with the finger 41 whose fingerprint is to be read as shown in FIG. 2 allows the fingerprint collation apparatus 1 to determine that the fingerprint reading sensor 21 has been pressed with the finger 41 or not. When it is determined that the fingerprint reading sensor 21 has been pressed with the finger 41, the fingerprint collation apparatus 1 reads an image of the fingerprint of the finger 41. Or conversely, when it is determined that the fingerprint reading sensor 21 has not been pressed with the finger 41, the fingerprint collation apparatus 1 executes no fingerprint reading.

The lamps 22 and 23 perform exclusive illuminating, in other words, illuminate to indicate that the contact condition of the finger 41 whose fingerprint is to be read is good or not, and that fingerprint collation is executable or not. The lamps 22 and 23 both go out to indicate a condition in which the finger 41 is not in contact with the fingerprint reading sensor 21.

As shown in FIG. 2, the fingerprint collation apparatus 1 supplies data specifying a fingerprint collation result to an external apparatus (not shown) through a cable 43 connected to a terminal 42. The cable 43 may include a cable conforming to the Universal Serial Bus (USB) standard, for instance. Alternatively, the cable 43 may be also of other types such as a cable of RS232C type, and in other words, the type of cables does not have specific restrictions on the present invention.

Carrying the fingerprint collation apparatus 1 with the protection cover 12 closed permits the body part 11, the fingerprint reading sensor 21 and the indication lamps 22 and 23, most of all, the fingerprint reading sensor 21 to be protected from both external unusual pressures and static electricity. As a result, the fingerprint collation apparatus 1 is prevented from being damaged or broken.

Figure 3:
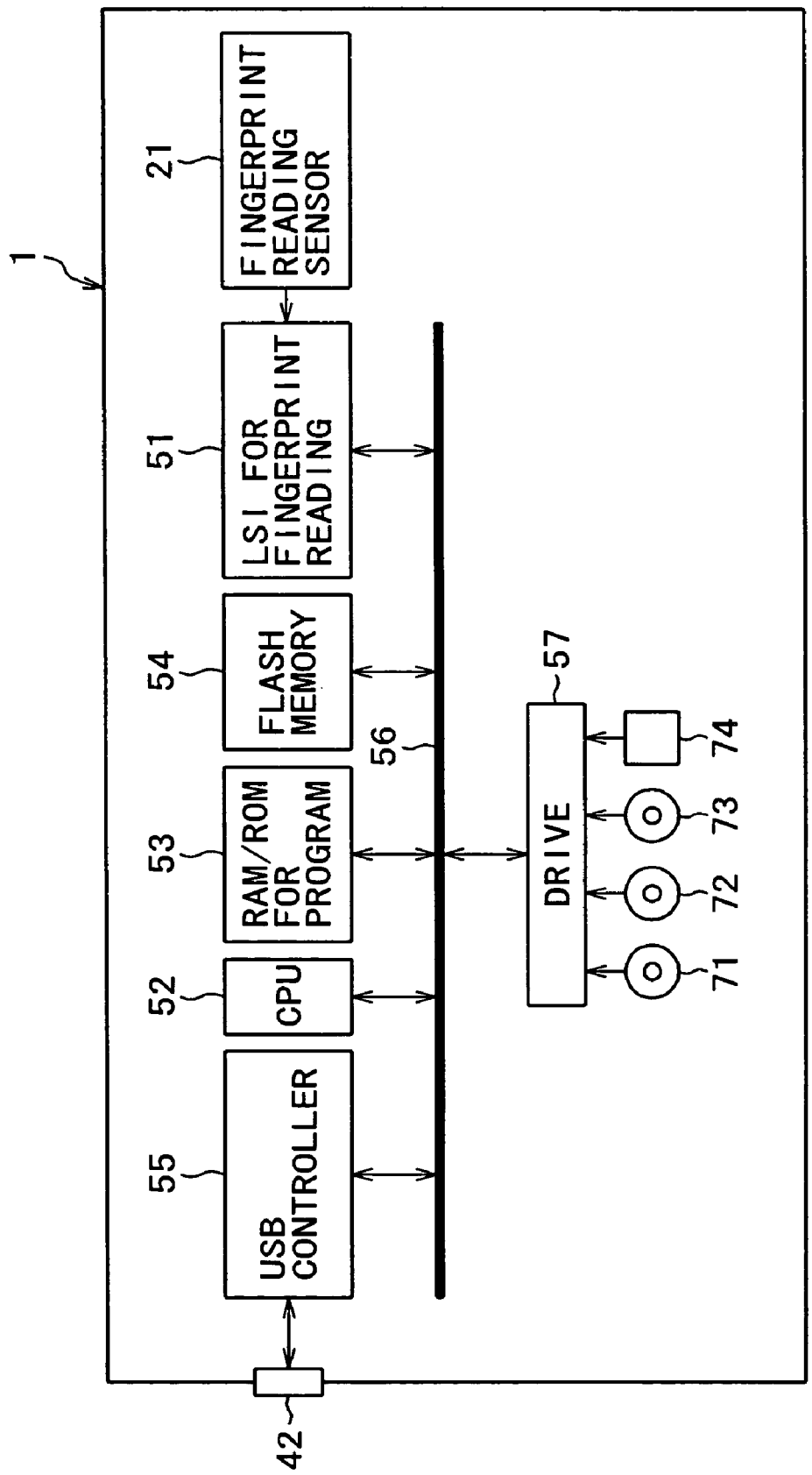
FIG. 3 is a block diagram illustrating a configuration of a fingerprint collation apparatus 1.

FIG. 3 is a block diagram illustrating a configuration of the fingerprint collation apparatus 1.

A Large Scale Integrated Circuit (LSI) for fingerprint reading 51 generates, from a signal supplied from the fingerprint reading sensor 21, a signal (which is hereinafter referred to as a finger positioning determination signal) used for determining whether the finger 41 is in contact with the fingerprint reading sensor 21 or not, and supplies the generated signal to a CPU 52. In addition, the LSI for fingerprint reading 51 generates a fingerprint image from the signal supplied from the fingerprint reading sensor 21, and supplies the generated fingerprint image to the CPU 52.

The CPU 52 controls the whole of the fingerprint collation apparatus 1. In addition, the CPU 52 determines, with reference to the finger positioning determination signal supplied from the LSI for fingerprint reading 51, that the finger 41 is in contact with the fingerprint reading sensor 21 or not. Further, the CPU 52 executes fingerprint registration or fingerprint collation with reference to the fingerprint image supplied from the LSI for fingerprint reading 51.

A Random Access Memory (RAM)/Read Only Memory (ROM) for program 53 is composed of RAM and ROM and holds a fingerprint collation program that is control firmware executed by the CPU 52. Both a fixed program and fixed parameters are basically stored in a ROM part of the RAM/ROM for program 53. On the other hand, parameters or data varying with the progress of running of the fingerprint collation program are stored in a RAM part of the RAM/ROM for program 53.

A flash memory 54 holds data (which is hereinafter referred to as registered data) extracted from a user's fingerprint image, when registration of the user's fingerprint was carried out. In other words, when the fingerprint is to be registered, the CPU 52 causes the flash memory 54 to hold registered data extracted from the fingerprint image supplied from the LSI for fingerprint reading 51. When the fingerprint is to be collated, the CPU 52 collates the registered image stored in the flash memory 54 with the fingerprint image supplied from the LSI for fingerprint reading 51.

A Universal Serial Bus (USB) controller 55 supplies the fingerprint collation result received from the CPU 52 to an external apparatus (not shown), which is connected to the USB controller through the terminal 42 in conformity with the USB standards. The USB controller 55 also accepts, from the external apparatus, an Identifier (ID) of a user whose fingerprint is being read. The USB controller 55 then supplies the accepted user's ID to the CPU 52. The user's ID (user ID) is stored as registered data in the flash memory 54.

The LSI for fingerprint reading 51, the CPU 52, the RAM/ROM for program 53, the flash memory 54 and the USB controller 55 are interconnected through a bus 56.

A drive 57 is connected to the bus 56 and mounted with a magnetic disc 71, an optical disc 72, a magneto-optical disc 73 or a semiconductor memory 74 with data or program thereon. The drive 57 loads the data or program from the magnetic disc 71, the optical disc 72, the magneto-optical disc 73 or the semiconductor memory 74 into the RAM/ROM for program 53 connected to the drive through the bus 56.

Details of the fingerprint reading sensor 21 are described in the following. The fingerprint reading sensor 21 is to read the fingerprint image with the finger 41 in direct contact with the sensor face as described above, and may employ for instance a sensor model CXA3271GE manufactured by Sony Corporation.

The fingerprint reading sensor 21 has, on an upper face with metal electrodes mounted in array thereon, an insulating film, thereby providing the sensor face. When the finger 41 rests on the sensor face of the fingerprint reading sensor 21, capacitors are created with the metal electrodes, the insulating film and the finger 41. In this case, the finger 41 functions as an electrode.

Each convex fingerprint portion of the finger 41 coming into being the electrode is closer than each concave fingerprint portion thereof to the metal electrodes of the fingerprint reading sensor 21. Also, the convex fingerprint portions of the finger 41 contact the insulating film, so that a capacitance of the capacitors created with the metal electrodes, the insulating film and the convex fingerprint portions of the finger 41 is determined by a dielectric constant of the insulating film.

On the other hand, the concave fingerprint portions of the finger 41 involve the presence of an air layer between the finger 41 coming into being the electrode and the insulating film. Thus, a capacitance of the capacitors created with the metal electrodes, the insulating film and the concave fingerprint portions of the finger 41 largely differs from that of the capacitors created with the metal electrodes, the insulating film and the convex fingerprint portions of the finger 41.

Accordingly, the fingerprint reading sensor 21 is configured to output an electric signal specifying irregularities of the fingerprint by converting electric charges accumulated in the capacitors created with the metal electrodes, the insulating film and the convex fingerprint portions of the finger 41 and the capacitors created with the metal electrodes, the insulating film and the concave fingerprint portions of the finger 41 into voltages.

Figure 4:
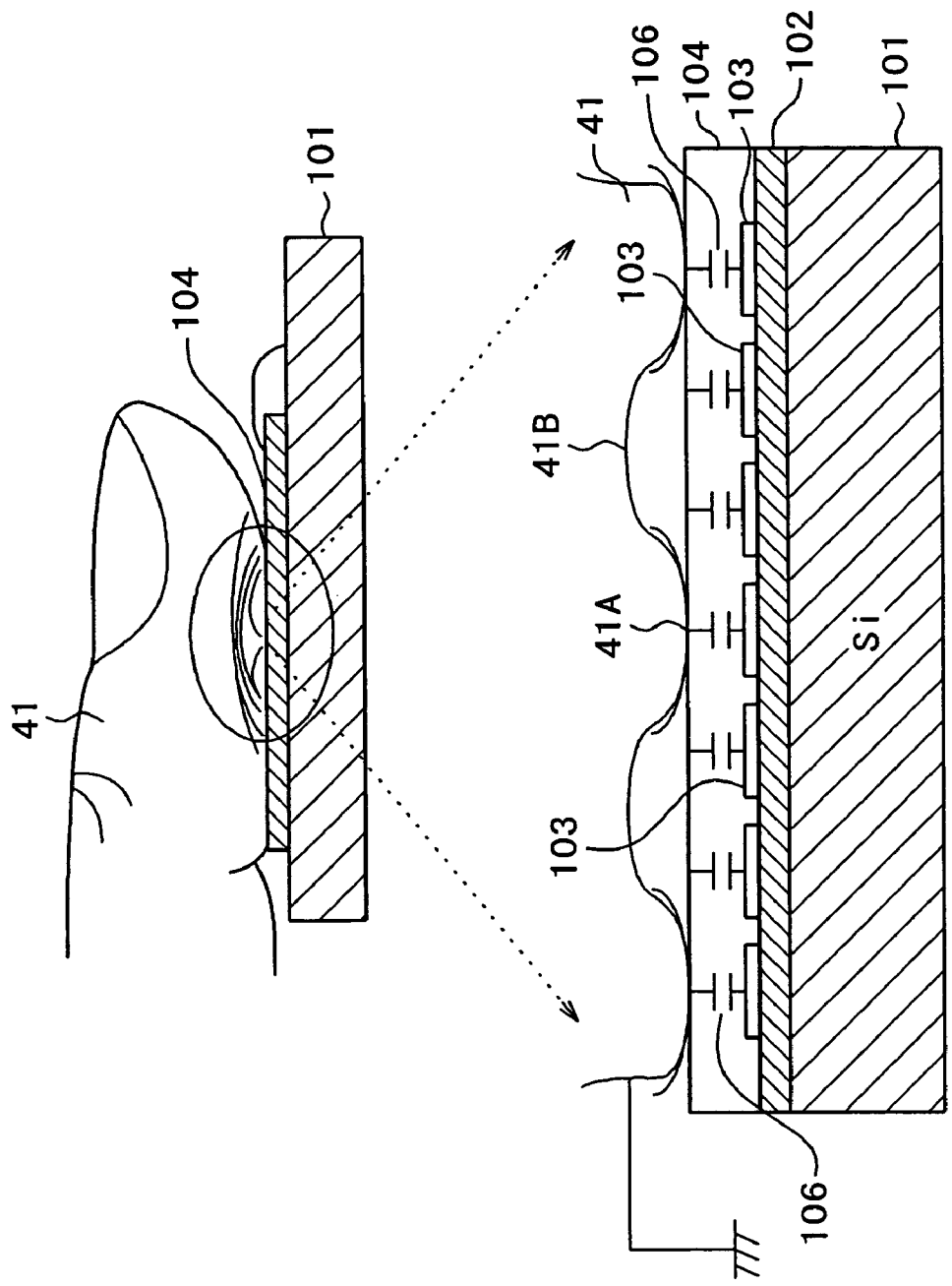
FIG. 4 is a schematic diagram, partly in enlarged details, illustrating a configuration of the fingerprint reading sensor 21 in principle.

FIG. 4 is a schematic diagram illustrating a configuration of principles of the fingerprint reading sensor 21.

As shown in FIG. 4, the fingerprint reading sensor 21 has a configuration in which an upper face of a silicon (Si) substrate with the metal electrodes 103 (sampling points) mounted in array at 80 μm pitches thereon through an interlayer film 102 is covered with an insulating film 104. The fingerprint reading sensor 21 detects the irregularities of the fingerprint with the finger 41 in direct contact with an upper face of the insulating film 104.

In other words, the finger 41 is a conductor, so that capacitors 106 are created with the metal electrodes 103, the insulating film 104 and the finger 41 when the finger 41 rests on the upper face of the insulating film 104. Then, the irregularities composed of convex fingerprint portions 41A and concave fingerprint portions 41B ensure that the capacitors 106 having different distances from the finger 41 coming into being the electrode to the metal electrodes 103 are created. Thus, the irregularities composed of the convex fingerprint portions 41A and the concave fingerprint portions 41B appear as a difference in capacitance between the capacitors 106.

In addition, the convex fingerprint portions 41A contact the insulating film 104, so that the capacitance of the capacitors 106 created with the convex fingerprint portions 41A is determined by a dielectric constant of the insulating film 104 and also by a thickness thereof. On the other hand, the concave fingerprint portions 41B involve the presence of the air layer between the finger 41 coming into being the electrode and the metal electrodes 103, in addition to the insulating film 104. Thus, the capacitance of the capacitors 106 created with the concave fingerprint portions 41B is determined by both the dielectric constant and the thickness of the insulating film 104 and a dielectric constant and a thickness of the air layer.

In other words, the capacitance of the capacitors 106 created with the concave fingerprint portions 41B of the finger 41 largely differs from that of the capacitors 106 created with the convex fingerprint portions 41A of the finger 41.

Accordingly, applying a fixed voltage to the metal electrodes 103 with the finger 41 in contact with the upper face (sensor face) of the fingerprint reading sensor 21 results in variations of the electric charges accumulated in the metal electrodes 103 with respect to the convex and concave fingerprint portions 41A and 41B of the finger 41. Thus, the fingerprint reading sensor 21 converts the electric charges accumulated in the metal electrodes 103 into the voltages to output the electric signal specifying the irregularities of the fingerprint.

Figure 5:
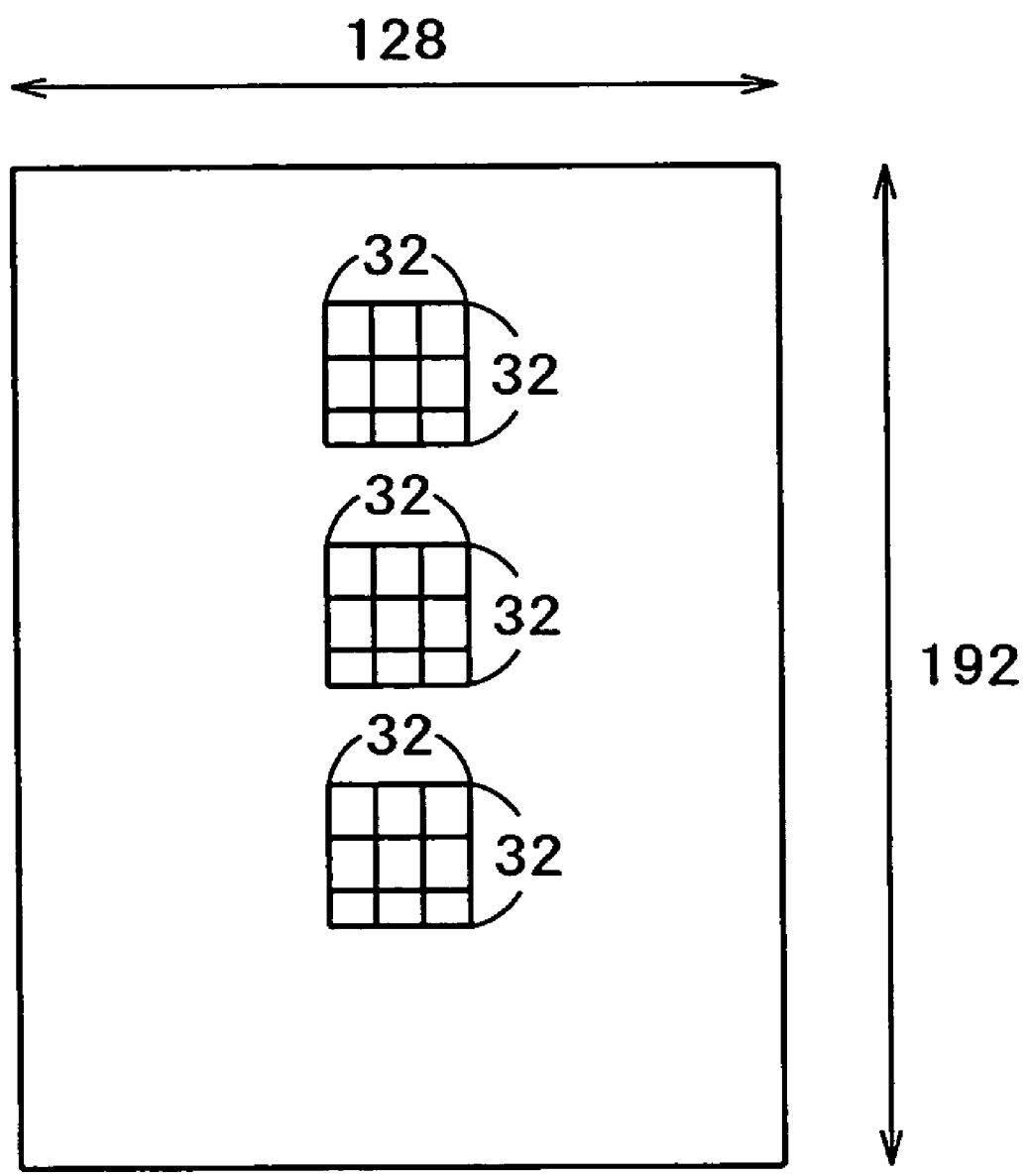
FIG. 5 is a schematic diagram illustrating placement of detection areas composed of metal electrodes 103 of the fingerprint reading sensor 21.

FIG. 5 is a schematic diagram illustrating placement of detection areas composed of the metal electrodes 103 of the fingerprint reading sensor 21.

The fingerprint reading sensor 21 has on the interlayer film 102 the metal electrodes 103 in the form of a matrix of 128 pieces in a horizontal direction and 192 pieces in a vertical direction at 80 μm pitches. The metal electrodes 103 are examples of sampling points.

Among 128 lines by 192 columns of metal electrodes 103, 32 by 32 pieces of metal electrodes 103 are assigned as a detection area that is effective in generating a signal for determining whether the finger 41 is in contact with the fingerprint reading sensor 21 or not. The detection area is an example of detection area of the sensor.

The detection area may be provided in one or more locations. For instance, the detection areas in three locations are available. In other words, it means that three sets of 32 by 32 pieces of metal electrodes 103 respectively assigned to three detection areas are obtained. In a case of providing the plurality of detection areas, the detection areas may be spaced at proper intervals.

Figure 6:
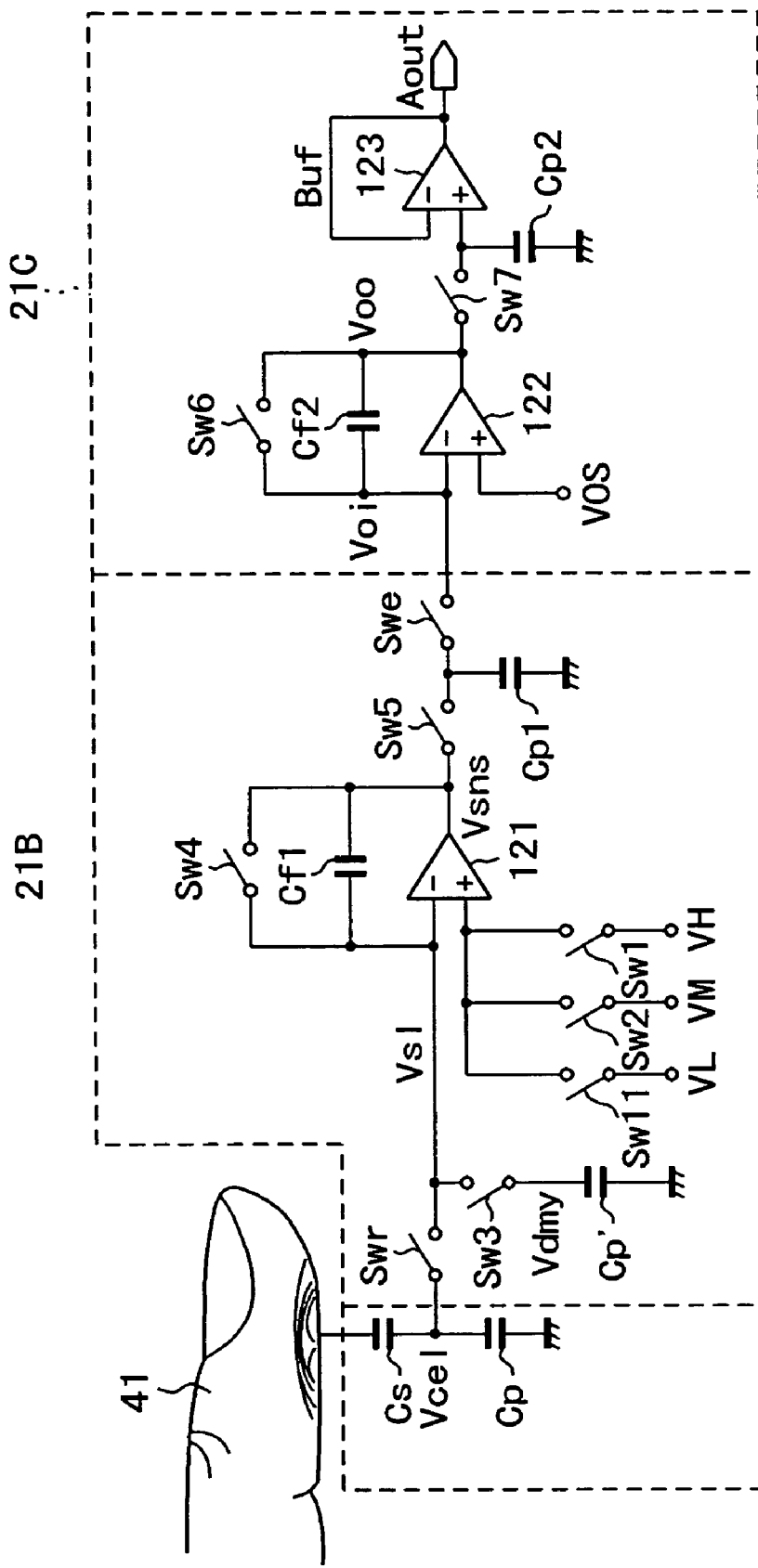
FIG. 6 is a circuit diagram illustrating an internal circuit of the fingerprint reading sensor 21.

An operation of converting the irregularities of the fingerprint into the electric signal by the fingerprint reading sensor 21 is described in the following. FIG. 6 is a circuit diagram illustrating an internal circuit of the fingerprint reading sensor 21.

The fingerprint reading sensor 21 comprises a sensor section 21A for detecting, as electric charge, a capacitance determined with the irregularities of the fingerprint, a sensor amplifier section 21B for converting the electric charge outputted from the sensor section 21A into a voltage signal and an output part 21C for outputting the voltage signal supplied from the sensor amplifier section 21B after amplification.

The fingerprint reading sensor 21 has a differential amplifier 121 for converting the electric charge into the voltage signal, a differential amplifier 122 for amplifying the voltage signal and a differential amplifier 123 for regulating output impedance.

In FIG. 6, capacitor Cs represents the capacitor 106 created between the finger 41 and each metal electrode 103. A capacitance of the capacitor Cs is hereinafter simply referred to as Cs.

Capacitor Cp is a capacitor equivalent to the parasitic capacitance created between the metal electrodes 103 and the silicon substrate 101. A capacitance of the capacitor Cp is hereinafter simply referred to as Cp. The capacitors Cs and Cp are connected in series. A voltage at a point of contact of the capacitor Cs with the capacitor Cp is hereinafter referred to as Vcel.

Capacitor Cp' is a capacitor that is useful canceling the capacitance of the capacitor Cp determined by the parasitic capacitance. The capacitor Cp' has one terminal grounded, with the other terminal connected to an inverted input terminal of the differential amplifier 121 through a switch Sw3. The capacitance of the capacitor Cp' is hereinafter simply referred to as Cp'. The capacitance of the capacitor Cp' is approximately equal to that of the capacitor Cp.

Capacitor Ch1 has one terminal grounded, with the other terminal connected to an output terminal of the differential amplifier 121 through a switch Sw5 and also connected to an inverted input terminal of the differential amplifier 122 through a switch Swe. Capacitor Ch2 has one terminal grounded, with the other terminal connected to an output terminal of the differential amplifier 122 through a switch Sw7 and also connected to a non-inverted input terminal of the differential amplifier 123. The capacitance of each of the capacitors Ch1 and Ch2 is a so-called hold capacitance that is useful in holding a voltage.

The capacitance of the capacitor Ch1 is hereinafter simply referred to as Ch1. The capacitance of the capacitor Ch2 is hereinafter simply referred to as Ch2.

Capacitor Cf1 has one terminal connected to the inverted input terminal of the differential amplifier 121, with the other terminal connected to the output terminal of the differential amplifier 121. The capacitance of the capacitor Cf1 is a feedback capacitance that is useful in determining a gain of the differential amplifier 121.

The capacitance of the capacitor Cf1 is hereinafter simply referred to as Cf1.

Capacitor Cf2 has one terminal connected to the inverted input terminal of the differential amplifier 122, with the other terminal connected to the output terminal of the differential amplifier 122. The capacitance of the capacitor Cf2 is a feedback capacitance that is useful in determining a gain of the differential amplifier 122. The capacitance of the capacitor Cf2 is hereinafter simply referred to as Cf2.

A switch Swr makes connection or disconnection between the point of contact of the capacitor Cs with the capacitor Cp connected thereto in series and the inverted input terminal of the differential amplifier 121. The switch Swe makes connection or disconnection between the opposite terminal to the grounded terminal of the capacitor Ch1 and the inverted input terminal of the differential amplifier 122.

A switch Sw1 has one terminal with a voltage VH applied thereto, with the other terminal connected to a non-inverted input terminal of the differential amplifier 121. A switch Sw2 has one terminal with a voltage VM applied thereto, with the other terminal connected to the non-inverted input terminal of the differential amplifier 121. A switch Sw11 has one terminal with a voltage VL applied thereto, with the other terminal connected to the non-inverted input terminal of the differential amplifier 121.

It is noted that the voltage VH is to be higher than the voltage VM, which is to be higher than the voltage VL. A difference between the voltage VH and the voltage VM is approximately equal to that between the voltage VM and the voltage VL.

The switch Sw3 has one terminal connected to the opposite terminal to the grounded terminal of the capacitor Cp', with the other terminal connected to the inverted input terminal of the differential amplifier 121. A switch Sw4 has one terminal connected to one terminal of the capacitor Cf1, with the other terminal connected to the other terminal of the capacitor Cf1. In other words, the switch Sw4 is connected in parallel to the capacitor Cf1.

The switch Sw5 has one terminal connected to the output terminal of the differential amplifier 121, with the other terminal connected to the opposite terminal to the grounded terminal of the capacitor Ch1 and also connected to the inverted input terminal of the differential amplifier 122 through the switch Swe. A switch Sw6 has one terminal connected to one terminal of the capacitor Cf2, with the other terminal connected to the other terminal of the capacitor Cf2. In other words, the switch Sw6 is connected in parallel to the capacitor Cf2.

The switch Sw7 has one terminal connected to the output terminal of the differential amplifier 122, with the other terminal connected to the opposite terminal to the grounded terminal of the capacitor Ch2 and also connected to the non-inverted input terminal of the differential amplifier 123.

The differential amplifier 122 has a non-inverted input terminal with a voltage VOS applied thereto.

An operation of the internal circuit of the fingerprint reading sensor 21 is described in the following.

It is noted that the operation of the fingerprint reading sensor 21 is started with the switches Swr, Swe, Sw1 to Sw11 disconnected, in other words, in off positions.

(1) Firstly, the switches Sw1, Sw4 and Swr are connected, in other words, turned on with an initial state, in other words, with the switches Swr, Swe and Sw1 to Sw11 being in off positions. Thus, the voltage Vcel at the point of contact of the capacitor Cs with the capacitor Cp is changed to VH. In this place, the electric charge accumulated in the capacitors Cs and Cp amounts to (Cs+Cp) VH.

(2) Then, the switches Sw1 and Swr are turned off.

(3) Next, the switches Sw11 and Sw3 are turned on and change a voltage Vdmy at a point of contact of the capacitor Cp' with the switch Sw3 to VL. In this place, the electric charge accumulated in the capacitor Cp' amounts to Cp'VL.

(4) Then, the switches Sw3 and Sw11 are turned off.

(5) Next, the switch Sw2 is turned on and changes a voltage Vsl applied to the inverted input terminal of the differential amplifier 121 to VM.

(6) Then, the switch Sw4 is turned off.

(7) Next, the switches Swr, Sw3 and Sw5 are turned on. At this event, the voltage Vcel is VH, the voltage Vdmy is VL, and the voltage Vsl applied to the inverted input terminal of the differential amplifier 121 is VM, so that transfer of electric charge determined by the following expression (1) arises among the capacitors Cs, Cp and Cp'.

$$(Cs+Cp)(VH-VM)-Cp'(VM-VL) \approx Cs(VH-VM) \quad (1)$$

Accordingly, an output voltage Vsns of the differential amplifier 121 is determined by the following expression (2).

$$Vsns=VM-Cs(VH-VM)/Cf1 \quad (2)$$

Thus, a gain of the sensor amplifier section 21B is determined independently of the parasitic capacitance Cp created between the metal electrodes 103 and the silicon substrate 101, so that an increased dynamic range is attainable.

Then, the voltage Vsns determined by the above expression (2) is applied to the capacitor Ch1.

(8) Then, the switch Sw5 is turned off.

(9) Next, the switch Sw6 is turned on and changes a voltage Voi at an input side (an inverted input terminal side of the differential amplifier 122) of the capacitor Cf2 to VOS.

(10) Then, the switch Sw6 is turned off.

(11) Next, the switches Swe and Sw7 are turned on. In this place, the electric charge transferred from the capacitor Ch1 to the capacitor Cf2 amounts to (VOS−Vsns) Ch1. This allows a voltage Voo at an output side (an output terminal side of the differential amplifier 122) of the capacitor Cf2 to be determined, thereby following that the electric charge is accumulated in the capacitor Ch2.

In addition, the voltage Voo is outputted to an output terminal Aout through the differential amplifier 123 that is a buffer amplifier.

How to detect the contact of the finger 41 with the sensor face of the fingerprint reading sensor 21 by the fingerprint collation apparatus 1 is described in the following.

FIG. 7 to FIG. 12 are schematic graphs respectively illustrating typical waveforms of output (the finger positioning determination signal) from the fingerprint reading sensor 21 in response to the contact of the finger 41 or the like with the fingerprint reading sensor 21. In FIG. 7 to FIG. 12, an output level of the fingerprint reading sensor 21 is scaled at a vertical axis, and output corresponding to the individual metal electrodes 103 is scaled at a horizontal axis. In the following description, the output corresponding to the individual metal electrodes 103 is also referred to as pixel.

A pixel level is to represent magnitude of data outputted from a sensor, in other words, the fingerprint reading sensor 21, for instance.

The output from the fingerprint reading sensor 21 shown in FIG. 7 to FIG. 12 is an instance of data outputted from the sensor.

Figure 7:
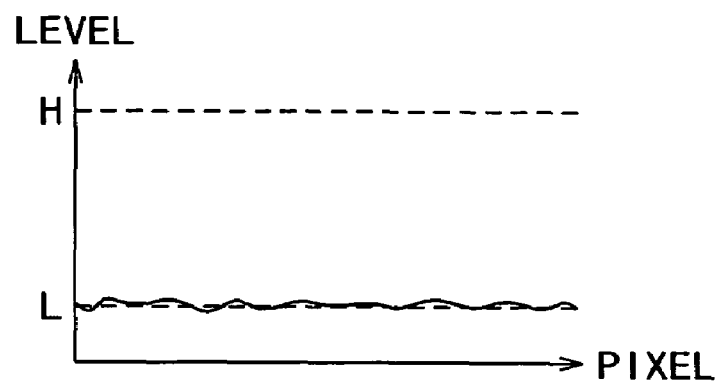
FIG. 7 is a waveform diagram illustrating a typical waveform of output from the fingerprint reading sensor 21.

In FIG. 7, there is shown an instance of output of the fingerprint reading sensor 21 in the absence of anything in contact with the fingerprint reading sensor 21 (except for air). In the absence of anything in contact with the fingerprint reading sensor 21, the capacitance Cs of the equivalent capacitors 106 reaches a maximum value, so that the level of output of the fingerprint reading sensor 21 is minimized as being determined according to the above expression (2).

As shown in FIG. 7, in the absence of anything in contact with the fingerprint reading sensor 21, the fingerprint reading sensor 21 outputs data of magnitude approximately close to a lower limit L with respect to all the pixels. The amplitude of output of the fingerprint reading sensor 21 in the absence of anything in contact with the fingerprint reading sensor 21 is approximately close to 0.

The amplitude of output of the fingerprint reading sensor 21 is an example of a difference between output values determined with reference to a maximum and a minimum of the magnitude of the data.

Figure 8:
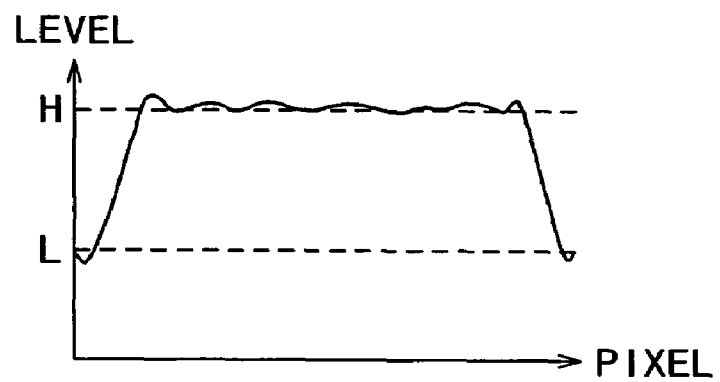
FIG. 8 is a waveform diagram illustrating a different typical waveform of output from the fingerprint reading sensor 21.

In FIG. 8, there is shown an instance of output of the fingerprint reading sensor 21 with presence of a water drop on the sensor's face. The water drop plays the role of an electrode, and stays in close contact with the insulating film 104 of the fingerprint reading sensor 21 in an approximately uniform state, so that the capacitance Cs of the equivalent capacitors 106 is minimized. Thus, the level of output of the fingerprint reading sensor 21 is maximized as being determined according to the above expression (2).

As shown in FIG. 8, when the water drop is adhered on the fingerprint reading sensor 21, the fingerprint reading sensor 21 outputs data of magnitude approximately close to a higher limit H with respect to approximately all the pixels. The amplitude of output of the fingerprint reading sensor 21 with the water drop staying thereon is approximately close to 0, except for an outer circumference of the water drop.

Figure 9:
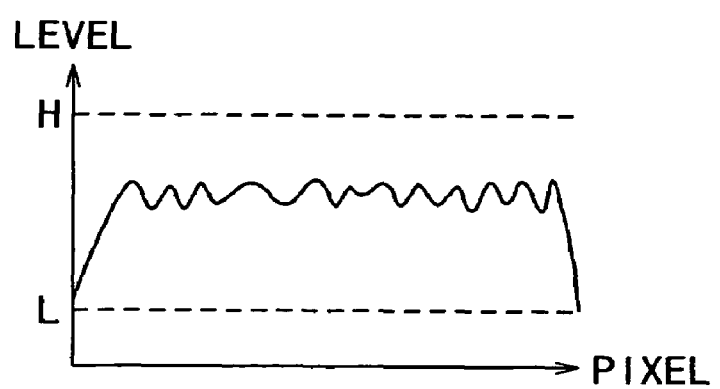
FIG. 9 is a waveform diagram illustrating a different typical waveform of output from the fingerprint reading sensor 21.

In FIG. 9, there is shown an instance of output of the fingerprint reading sensor 21 whose sensor face is stained with the fingerprint or the like. When the sensor face of the fingerprint reading sensor 21 is stained with the fingerprint or the like, the level of output of the fingerprint reading sensor 21 falls in the range of more than the lower limit L to less than the higher limit H. In other words, the fingerprint reading sensor 21 outputs data of magnitude between the lower limit L and the higher limit H. The amplitude of output of the fingerprint reading sensor 21 whose sensor face is stained with the fingerprint or the like results in a larger prescribed value, as compared with that in the absence of anything in contact with the fingerprint reading sensor and that with the water drop staying thereon.

In FIG. 10, there is shown an instance of output of the fingerprint reading sensor 21 at a time when the finger 41 whose skin is dry (which is hereinafter also referred to as a dry fingerprint) is in contact with the fingerprint reading sensor 21. Because of the dry skin of the finger 41, the finger 41 may not fully play the role of the electrode, so that the capacitance Cs of the equivalent capacitors 106 becomes relatively large. Thus, the output of the fingerprint reading sensor 21 shows a relatively lower level as a whole, as shown in FIG. 10. The amplitude of output of the fingerprint reading sensor 21 contacting the finger 41 whose skin is dry results in a larger prescribed value, as compared with that in the absence of anything in contact with the fingerprint reading sensor 21 and that with the water drop staying thereon.

In FIG. 11, there is shown an instance of output of the fingerprint reading sensor 21 at a time when the finger 41 whose skin has excessive water on its surface (which is hereinafter also referred to as a greasy fingerprint) is in contact with the fingerprint reading sensor 21. Because of the excessive water on the surface of the finger 41, the air layer between the fingerprint reading sensor and the concave fingerprint portions 41B of the finger 41 is made thinner, so that the capacitance Cs of the capacitors 106 created with the concave fingerprint portions 41B becomes relatively small. Thus, the output of the fingerprint reading sensor 21 shows a relatively higher level as a whole, as shown in FIG. 11. The amplitude of output of the fingerprint reading sensor 21 contacting the finger 41 whose skin has excessive water on its surface results in a larger prescribed value, as compared with that in the absence of anything in contact with the fingerprint reading sensor 21 and that with the water drop adhered thereon.

In FIG. 12, there is shown an instance of output of the fingerprint reading sensor 21 at a time when the finger 41 whose skin is in an ideal condition is in contact with the fingerprint reading sensor 21. When the finger 41 whose skin is in the ideal condition is in contact with the fingerprint reading sensor 21, the fingerprint reading sensor 21 outputs data of magnitude varying from the lower limit L to the higher limit H. Thus, the amplitude of output of the fingerprint reading sensor 21 contacting the finger 41 whose skin is in the ideal condition shows a difference between the higher limit H and the lower limit L and results in the largest value.

A process to classify the output of the fingerprint reading sensor 21 into patterns in order to effect detection of the contact of the finger 41 with the fingerprint reading sensor 21 is described in the following.

Figure 13:
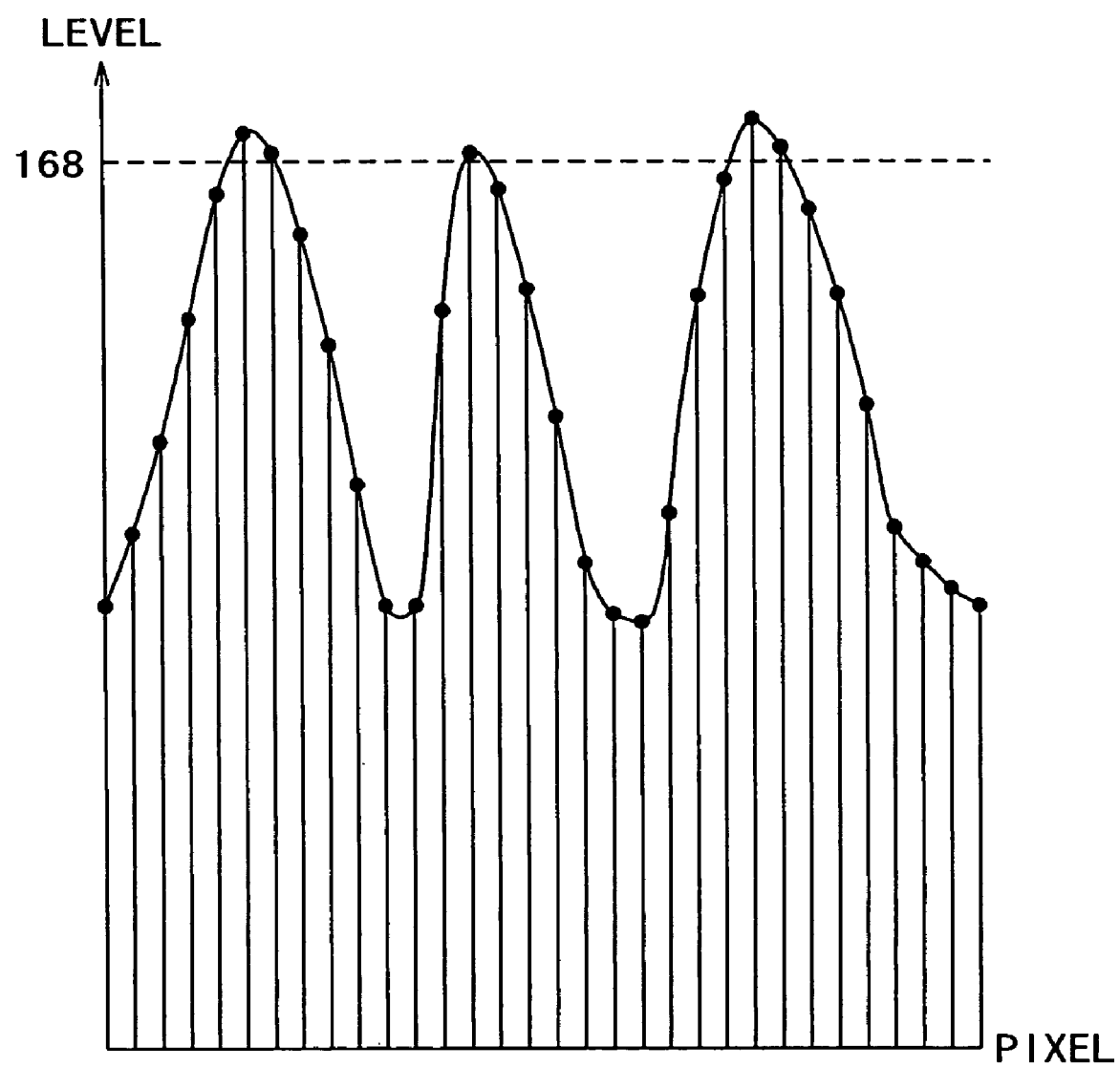
FIG. 13 is a waveform diagram illustrating H count.

Firstly, the CPU 52 counts data (which is hereinafter also referred to as H count) of magnitude equal or above a prescribed threshold (which is hereinafter also referred to as a higher limit threshold) close to the higher limit H among data contained in the detection area output of the fingerprint reading sensor 21. When the higher limit H is assumed to be 178, for instance, the CPU 52 specifies the higher limit threshold as 168 and counts data of magnitude equal or above 168 among pixel-by-pixel data contained in the detection area output of the fingerprint reading sensor 21, as shown in FIG. 13. In the example of preferred embodiment shown in FIG. 13, the H count results in 5.

Figure 14:
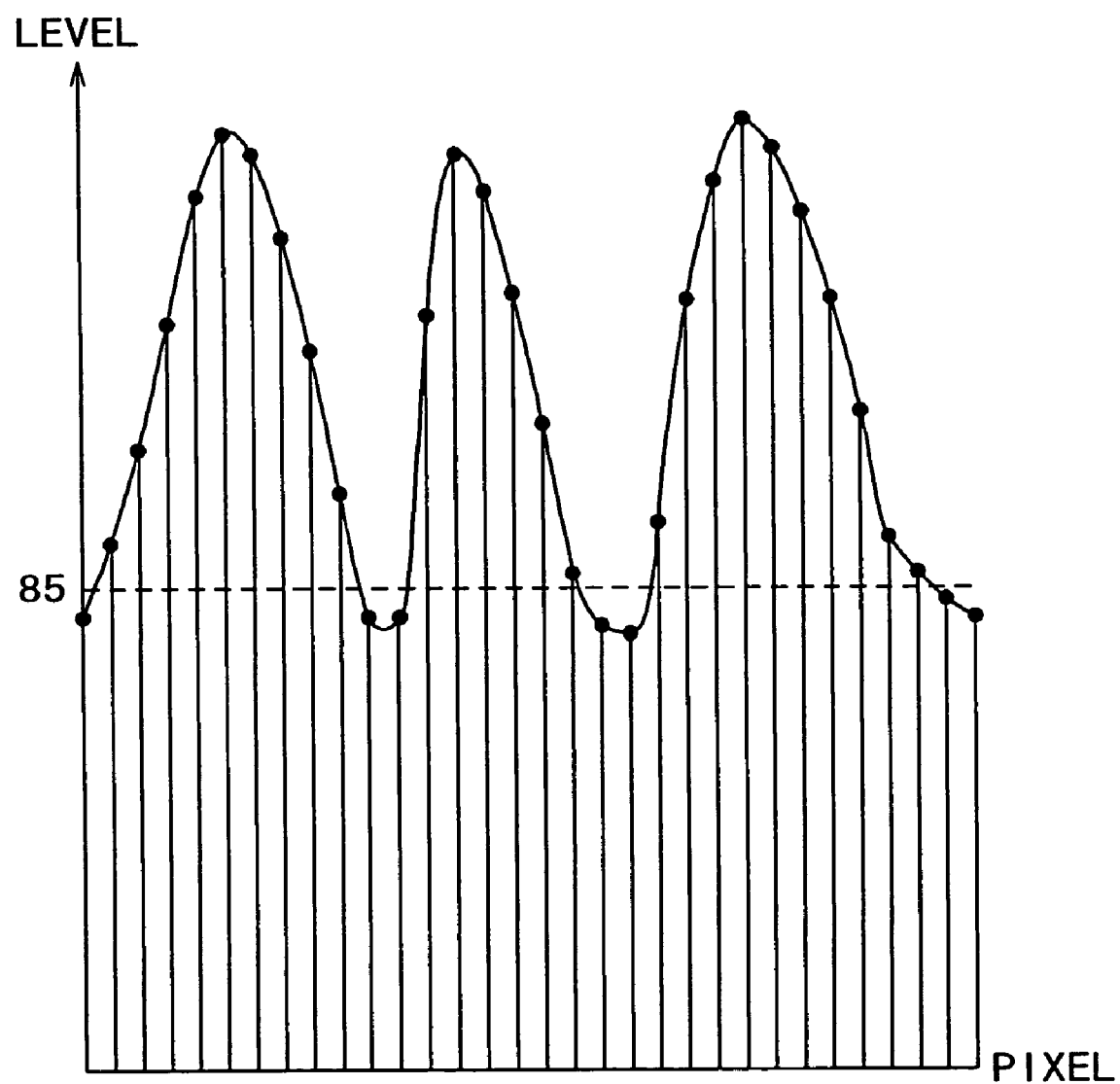
FIG. 14 is a waveform diagram illustrating L count.

Next, the CPU 52 counts data (which is hereinafter also referred to as L count) of magnitude equal or below a prescribed threshold (which is hereinafter also referred to as a lower limit threshold) close to the lower limit L among data contained in the detection area output of the fingerprint reading sensor 21. When the lower limit L is assumed to be 80, for instance, the CPU 52 specifies the lower limit threshold as 85 and counts data of magnitude equal or below 85 among pixel-by-pixel data contained in the detection area output of the fingerprint reading sensor 21, as shown in FIG. 14. In an embodiment shown in FIG. 14, the L count results in 7.

Further, the CPU 52 calculates the amplitude of output of the fingerprint reading sensor 21. Firstly, the CPU 52 obtains a maximum (which is hereinafter also referred to as MAX) of the data contained in the detection area output of the fingerprint reading sensor 21. The CPU 52 detects data of the detection area output of the fingerprint reading sensor 21 within a range prescribed with reference to the maximum of the data contained in the detection area output of the fingerprint reading sensor 21. Then, the CPU 52 calculates an average detection area output of the fingerprint reading sensor 21 within the range prescribed with reference to the maximum.

Also, the CPU 52 obtains a minimum (which is hereinafter also referred to as MIN) of the data contained in the detection area output of the fingerprint reading sensor 21. The CPU 52 detects data of the detection area output of the fingerprint reading sensor 21 within a range prescribed with reference to the minimum of the data contained in the detection area output of the fingerprint reading sensor 21. Then, the CPU 52 calculates an average detection area output of the fingerprint reading sensor 21 within the range prescribed with reference to the minimum.

Then, the CPU 52 specifies, as the amplitude, a difference between the average detection area output of the fingerprint reading sensor 21 within the range prescribed with reference to the maximum and the average detection area output of the fingerprint reading sensor 21 within the range prescribed with reference to the minimum.

As shown in FIG. 15, for instance, the CPU 52 calculates an average detection area output (shown by a chain line in FIG. 15) of the fingerprint reading sensor 21 within a range of data from the maximum (MAX) to MAX −5. The CPU 52 also calculates an average detection area output (shown by a chain double-dashed line in FIG. 15) of the fingerprint reading sensor 21 within a range of data from the minimum (MIN) to MIN +5. The CPU 52 specifies, as the amplitude, a difference between the average detection area output of the fingerprint reading sensor 21 within the range of data from the maximum (MAX) to MAX −5 and the average detection area output of the fingerprint reading sensor 21 within the range of data from the minimum (MIN) to MIN +5.

The fingerprint collation apparatus 1 classifies output of the fingerprint reading sensor 21 into either of a plurality of patterns with reference to the H count specifying the number of data close to the higher limit H and the L count specifying the number of data close to the lower limit L among the data contained in the detection area output of the fingerprint reading sensor 21, together with the amplitude of the detection area output.

With reference to a threshold (which is hereinafter also referred to as a H count threshold) corresponding to the H count, the CPU 52 sets a H count parameter to 1 when a value of the H count is equal or above the H count threshold. On the other hand, when the value of the H count is less than the H count threshold, the CPU 52 sets the H count parameter to 0.

When 32 by 32 pieces of metal electrodes 103 are assigned to the detection area, for instance, the H count threshold is specified as 10 for the H count of the detection area output.

With reference to a threshold (which is hereinafter also referred to as a L count threshold) corresponding to the L count, the CPU 52 sets a L count parameter to 1 when a value of the L count is equal or above the L count threshold. On the other hand, when the value of the L count is less than the L count threshold, the CPU 52 sets the L count parameter to 0.

When 32 by 32 pieces of metal electrodes 103 are assigned to the detection area, for instance, the L count threshold is specified as 10 for the L count of the detection area output.

With reference to a threshold (which is hereinafter also referred to as amplitude threshold) corresponding to the amplitude, the CPU 52 sets an amplitude parameter to 1 when a value of the amplitude is equal or above the amplitude threshold. On the other hand, when the value of the amplitude is less than the amplitude threshold, the CPU 52 sets the amplitude parameter to 0.

When 32 by 32 pieces of metal electrodes 103 are assigned to the detection area, for instance, the amplitude threshold is specified as 40 for the amplitude of the detection area output.

The detection area output of the fingerprint reading sensor 21 is classified into either of a plurality of patterns with reference to the H count parameter, the L count parameter and the amplitude parameter, which are specified as described above. As shown in FIG. 16, for instance, the detection area output of the fingerprint reading sensor 21 is classified into either of sixteen patterns with reference to a combination of the H count parameter, the L count parameter aid the amplitude parameter.

In an embodiment shown in FIG. 16, when the H count parameter is 0, the L count parameter is 0 and the amplitude parameter is 0, the detection area output of the fingerprint reading sensor 21 is classified into a pattern 0.

In the following description, the combination of the H count parameter, the L count parameter and the amplitude parameter is shown by a numeric representation in order of the H count parameter, the L count parameter and the amplitude parameter. A combination (1,0,1) of the H count parameter, the L count parameter and the amplitude parameter represents that the H count parameter is 1, the L count parameter is 0 and the amplitude parameter is 1, for instance.

When the combination of the H count parameter, the L count parameter and the amplitude parameter is represented by (0,0,1), the detection area output of the fingerprint reading sensor 21 is classified into a pattern 1. When the combination of the H count parameter, the L count parameter and the amplitude parameter is represented by (0,1,0), the detection area output of the fingerprint reading sensor 21 is classified into a pattern 2. When the combination of the H count parameter, the L count parameter and the amplitude parameter is represented by (0,1,1), the detection area output of the fingerprint reading sensor 21 is classified into a pattern 3.

When the combination of the H count parameter, the L count parameter and the amplitude parameter is represented by (1,0,0), the detection area output of the fingerprint reading sensor 21 is classified into a pattern 4. When the combination of the H count parameter, the L count parameter and the amplitude parameter is represented by (1,0,1), the detection area output of the fingerprint reading sensor 21 is classified into a pattern 5. When the combination of the H count parameter, the L count parameter and the amplitude parameter is represented by (1,1,0), the detection area output of the fingerprint reading sensor 21 is classified into a pattern 6.

When the combination of the H count parameter, the L count parameter and the amplitude parameter is represented by (1,1,1), the detection area output of the fingerprint reading sensor 21 is classified into a pattern 7.

It is noted that the H count parameter, the L count parameter and the amplitude parameter are by no means limited to 1-bit parameters as described above. Alternatively, parameters of a plurality of bits are also available.

FIG. 17 illustrates results of actual measurements on the patterns of output of the fingerprint reading sensor 21 when the H count threshold, the L count threshold and the amplitude threshold were respectively specified as 10, 10 and 40 on the assumption that the higher limit H and the lower limit L are respectively 178 and 80 to specify the higher limit threshold as 168, the lower limit threshold as 85 and the range applied to calculation of the amplitude as from the maximum to −5 and from the minimum to +5.

In FIG. 17, the number of patterns represents the number of times at which the detection area output of the fingerprint reading sensor 21 was classified into either of the patterns 0 to 7. An average H count represents the average of H count in the detection area output of the fingerprint reading sensor 21 for each pattern. An average L count represents the average of L count in the detection area output of the fingerprint reading sensor 21 for each pattern. An average amplitude represents the average of amplitude in the detection area output of the fingerprint reading sensor 21 for each pattern.

When the sensor face of the fingerprint reading sensor 21 is stained with the fingerprint or the like before contact of the finger 41 with the fingerprint reading sensor 21, the detection area output of the fingerprint reading sensor 21 is classified into the pattern 1. In the actual measurement shown in FIG. 17, classification of the detection area output of the fingerprint reading sensor 21 into the pattern 1 was achieved eight times, with the result that the average H count, the average L count and the average amplitude were 2, 0 and 72, respectively.

When the finger 41 is not in contact with the fingerprint reading sensor 21 whose sensor face is not stained with any fingerprint or the like, the detection area output of the fingerprint reading sensor 21 is classified into the pattern 2. In the actual measurement shown in FIG. 17, classification of the detection area output of the fingerprint reading sensor 21 into the pattern 2 was achieved once, with the result that the average H count, the average L count and the average amplitude were 0, 887 and 36, respectively.

When the fingerprint is the dry fingerprint, in other words, the finger 41 whose skin is dry is in contact with the fingerprint reading sensor 21, the detection area output of the fingerprint reading sensor 21 is classified into the pattern 3. In the actual measurement shown in FIG. 17, classification of the detection area output of the fingerprint reading sensor 21 into the pattern 3 was achieved eighteen times, with the result that the average H count, the average L count and the average amplitude were 3, 238 and 84, respectively.

When the water drop is staying on the fingerprint reading sensor 21, the detection area output of the fingerprint reading sensor 21 is classified into the pattern 4. However, when the fingerprint is the greasy fingerprint, in other words, the finger 41 whose skin has excessive water on its surface is in contact with the fingerprint reading sensor 21, the experiments proved that a condition extremely close to that in which the water drop is staying on the fingerprint reading sensor is observed and that the detection area output of the fingerprint reading sensor 21 is sometimes classified into the pattern 4.

When the fingerprint is the greasy fingerprint, in other words, the finger 41 whose skin has excessive water on its surface is in contact with the fingerprint reading sensor 21, the detection area output of the fingerprint reading sensor 21 is classified into the pattern 5. In the actual measurement shown in FIG. 17, classification of the detection area output of the fingerprint reading sensor 21 into the pattern 5 was achieved 149 times, with the result that the average H count, the average L count and the average amplitude were 372, 1 and 80, respectively.

In the actual measurements shown in FIG. 17, no classification of the detection area output of the fingerprint reading sensor 21 into the pattern 6 was found.

When the finger 41 whose skin is in the ideal condition is in contact with the fingerprint reading sensor 21, the detection area output of the fingerprint reading sensor 21 is classified into the pattern 7. In the actual measurement shown in FIG. 17, classification of the detection area output of the fingerprint reading sensor 21 into the pattern 7 was achieved 81 times, with the result that the average H count, the average L count and the average amplitude were 116, 95 and 88, respectively.

The procedure of a fingerprint collation process by the fingerprint collation apparatus 1 at a time when the fingerprint collation program is executed with the CPU 52 is described with reference to a flowchart of FIG. 18 in the following.

In the process at Step S111 of the fingerprint collation program, finger positioning on the fingerprint reading sensor 21 is detected with reference to the finger positioning determination signal generated by the LSI for fingerprint reading 51 from the signal supplied from the fingerprint reading sensor 21.

Figure 19:
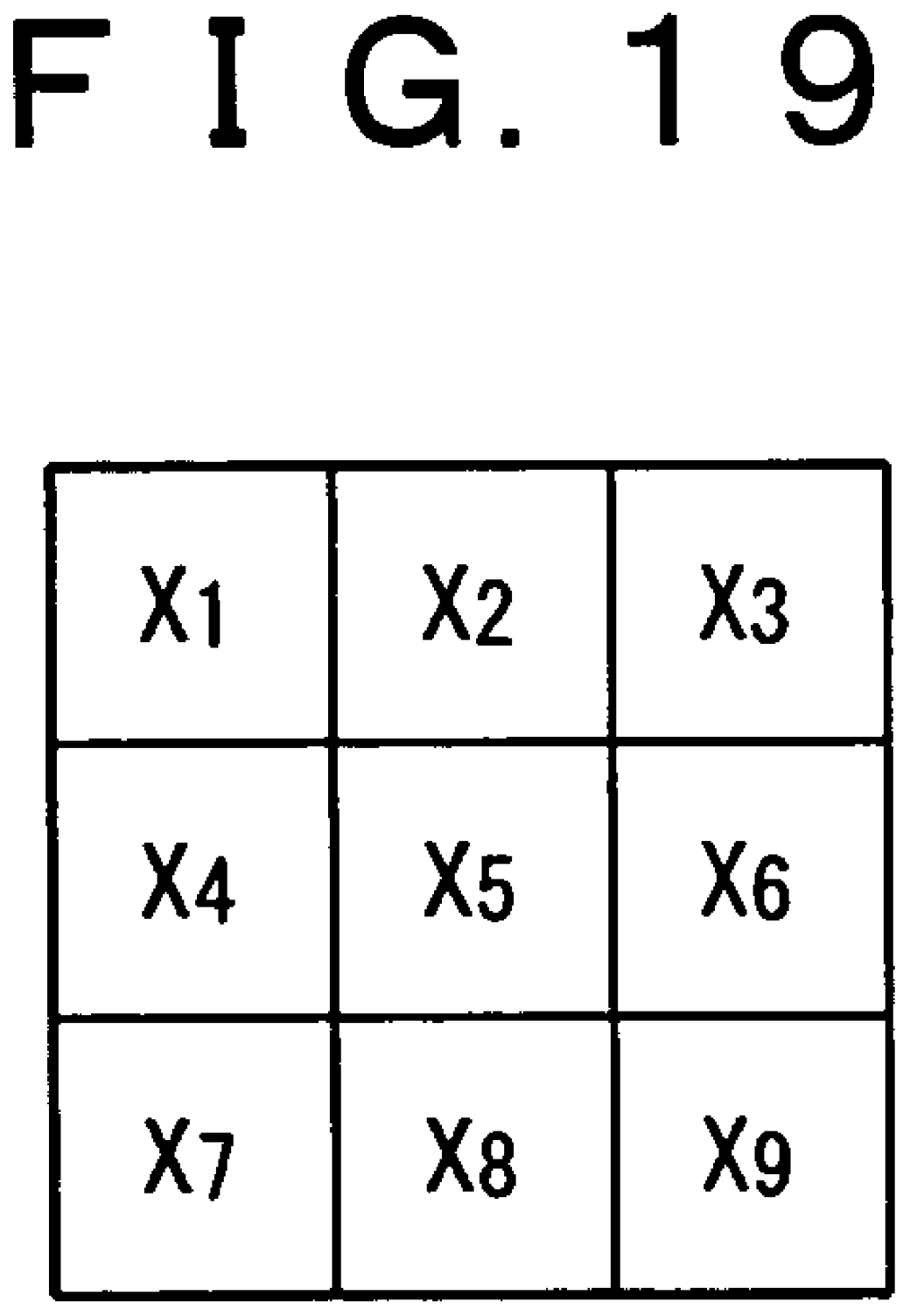

For instance, the fingerprint collation program detects finger positioning on the fingerprint reading sensor 21 with reference to a level calculated from each of the values assigned to the detection area correspondingly to the individual metal electrodes 103 of the fingerprint reading sensor 21. FIG. 19 illustrates a detection area obtained by extracting 3×3 values ranging of x1 to x9 from the values assigned to the detection area composed of 32 by 32 pieces of metal electrodes 103. In FIG. 19, when a centrally assigned value x5 among 3×3 values is specified as a noted value, the fingerprint collation program calculates a difference between the noted value and each of values x1 to x9 adjoining thereto and to sum up the calculated differences.

The fingerprint collation program sums up a difference between the noted value and each value adjoining thereto, with each of values assigned to the detection area correspondingly to the individual metal electrodes 103 of the fingerprint reading sensor 21 as the noted value in sequence, and further to calculate the sum total of differences.

Figure 20:
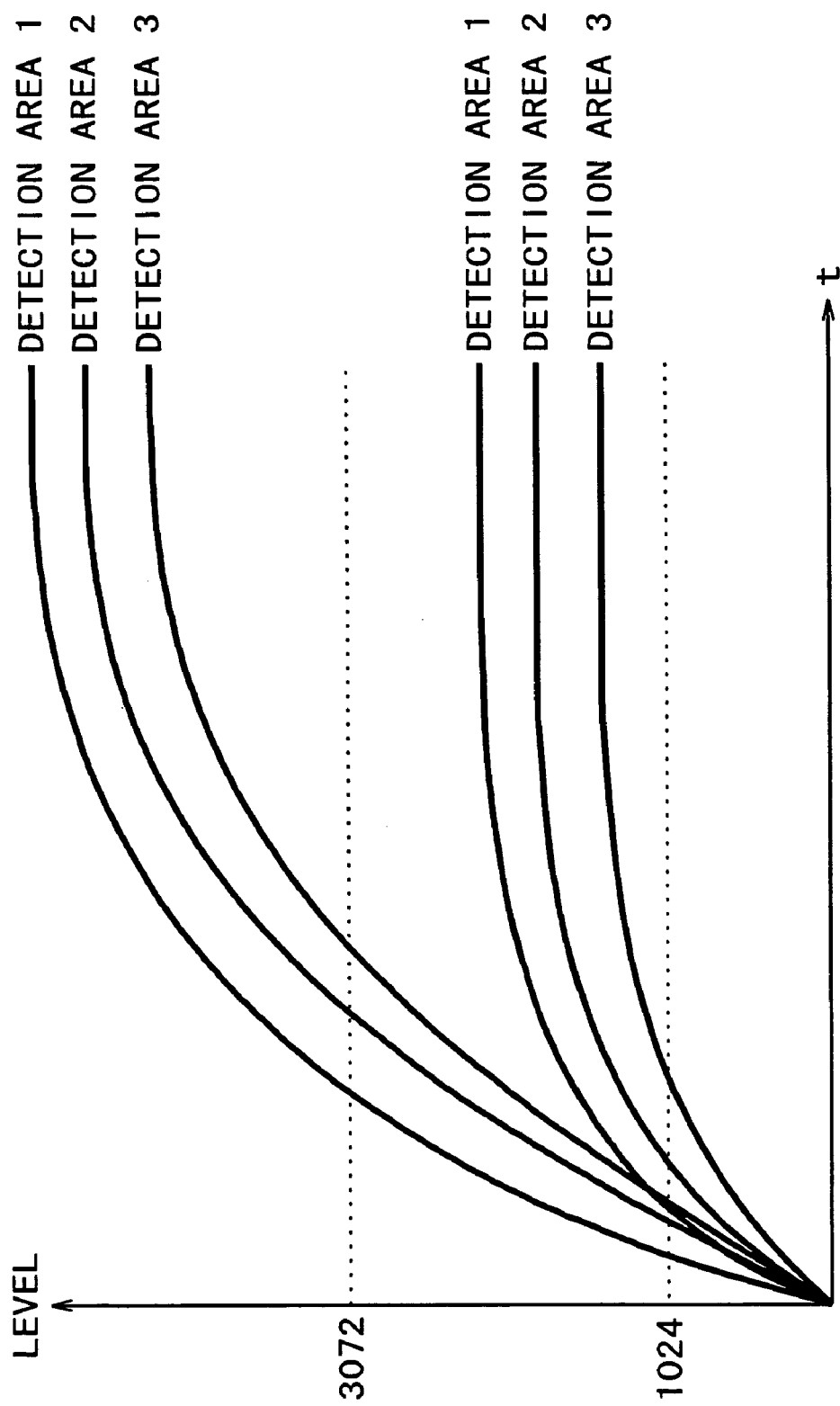
FIG. 20 is a schematic diagram illustrating the finger positioning detection process.

FIG. 20 illustrates a change of level with the passage of time, when a level is exploited to represent the sum total of differences obtained by summing up the difference between the noted value and each value adjoining thereto, with each of the values assigned to the detection area correspondingly to the individual metal electrodes 103 of the fingerprint reading sensor 21 as the noted value in sequence.

A capacitance obtained with the finger 41 as the electrode rises with the passage of time from a point of time of the contact of the finger 41 with the fingerprint reading sensor 21. Conversely, when an object other than the living form is brought into contract with the fingerprint reading sensor 21, a capacitance obtained with the object other than the living form as the electrode shows a fixed value irrespectively of the passage of time.

The fingerprint collation program detects finger positioning with reference to the sum total of differences obtained by summing up the difference between the noted value and each value adjoining thereto with respect to each noted value for the plurality of detection areas. In detecting the finger positioning with three detection areas, the fingerprint collation program determines whether the finger 41 rests on the fingerprint reading sensor 21 when the sum total of differences obtained by summing up the difference between the noted value and each value adjoining thereto with respect to each noted value for either of the three detection areas such as the detection areas 1, 2 and 3 has surpassed a prescribed threshold, as shown in FIG. 20, for instance. In other words, the fingerprint collation program determines that the finger 41 rests on the fingerprint reading sensor 21 when the sum total of differences obtained by summing up the difference between the noted value and each value adjoining thereto with respect to each noted value for either detection area 1, 2 or 3 has surpassed 3072.

Alternatively, in detecting the finger positioning with the three detection areas, the fingerprint collation program determines that the finger 41 rests on the fingerprint reading sensor 21 when the sum total of differences obtained by summing up the difference between the noted value and each value adjoining thereto with respect to each noted value for all the three detection areas such as the detection areas 1, 2 and 3 has surpassed a different threshold. In other words, the fingerprint collation program determines that the finger 41 rests on the fingerprint reading sensor 21 when the sum total of differences obtained by summing up the difference between the noted value and each value adjoining thereto with respect to each noted value for all the detection areas 1, 2 and 3 has surpassed 1024.

In the process at Step S12 of the fingerprint collation program, a pattern classification process is executed on the output (finger positioning determination signal generated by the LSI for fingerprint reading 51 from the signal supplied from the fingerprint reading sensor 21) of the fingerprint reading sensor 21. The details of the pattern classification process are described later with reference to a flowchart of FIG. 22.

In the process at Step S13 of the fingerprint collation program, a finger contact determination process is executed. The details of the finger contact determination process are described later.

In the process at Step S14 of the fingerprint collation program, it is determined that the object in contact with the fingerprint reading sensor 21 is recognized as the finger 41 or not in the process at Step S13. When it is determined that the object in contact with the fingerprint reading sensor 21 is recognized as the finger 41, the procedure goes on to Step S15.

Figure 21:
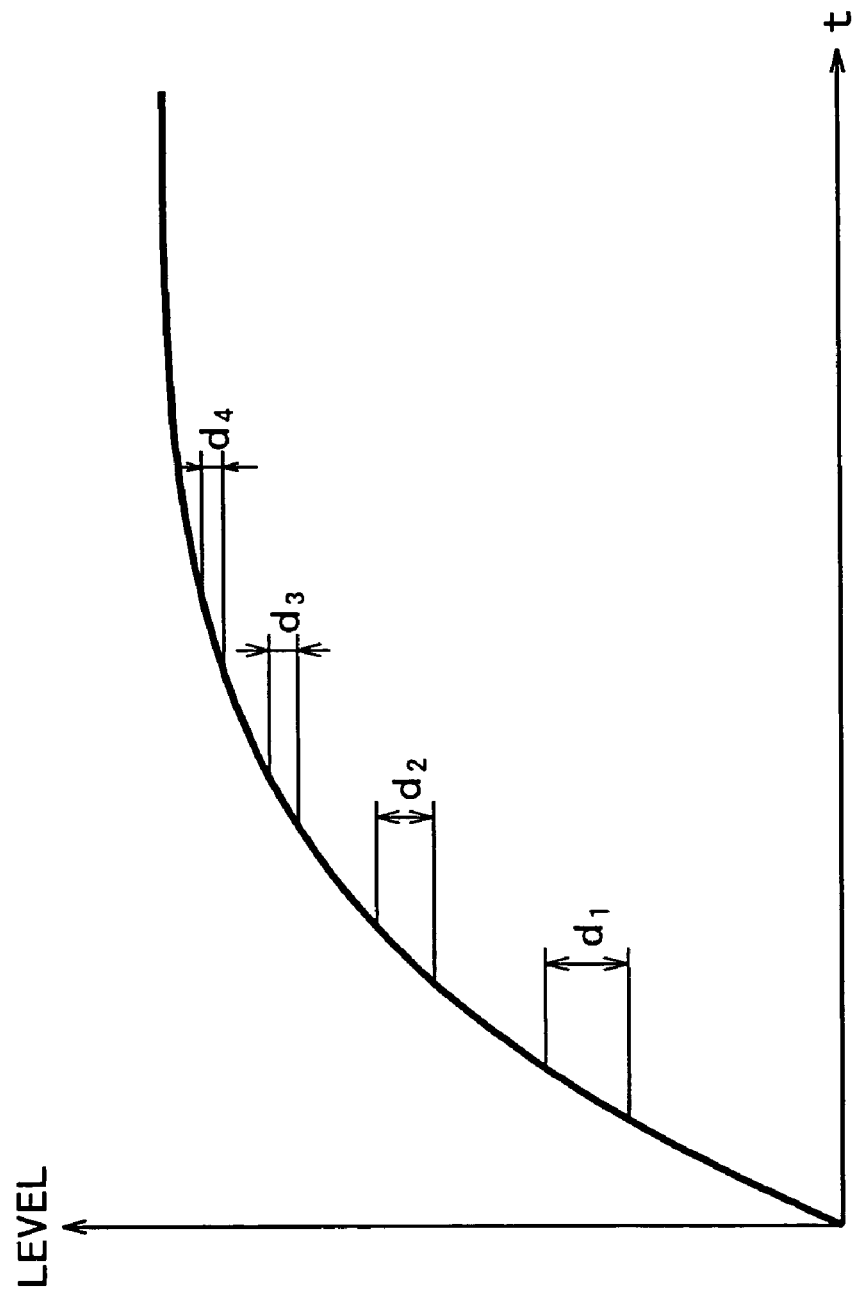
FIG. 21 is a schematic diagram illustrating a change of output from the fingerprint reading sensor 21 per unit time.

In the process at Step S15 of the fingerprint collation program, the fingerprint collation program waits until the amplitude of the fingerprint reading sensor 21 is stable. In other words, the capacitance obtained with the finger 41 as the electrode rises with the passage of time as described above, so that the fingerprint collation program calculates a change of output from the fingerprint reading sensor 21 per unit time. Then, the fingerprint collation program waits until the change of output from the fingerprint reading sensor 21 per unit time reaches a prescribed threshold or below. As shown in FIG. 21, for instance, the change of output from the fingerprint reading sensor 21 per unit time at the beginning of contact of the finger 41 with the fingerprint reading sensor 21 is relatively large as being expressed by d1. And, with the passage of time, the change of output from the fingerprint reading sensor 21 per unit time is gradually decreased as expressed by d2, d3 and d4. The fingerprint collation program thus determines that the stabled amplitude of the fingerprint reading sensor 21 is attained, when the change of output from the fingerprint reading sensor 21 per unit time reaches d4 or below, for instance.

In the process at Step S16 of the fingerprint collation program, a fingerprint image of the finger 41 is read. For instance, the fingerprint collation program reads the fingerprint image by allowing the LSI for fingerprint reading 51 to convert the output from the fingerprint reading sensor 21 into the fingerprint image. The fingerprint image may be an image of prescribed bits per pixel, more specifically, a binary image, for instance.

In the process at Step S17 of the fingerprint collation program, it is determined that fingerprint registration is requested or not. When it is determined that the fingerprint registration is requested, the procedure goes on to Step S8, where the fingerprint image read by the process at Step S16 is registered, and the fingerprint collation process is completed. For instance, the fingerprint collation program registers the fingerprint image by allowing the flash memory 54 to hold the data that is obtained by being extracted from data contained in the fingerprint image.

When it is determined at Step S17 that the fingerprint registration is not requested, the procedure goes on to Step S19, where the fingerprint collation program determines whether fingerprint collation is requested or not. When it is determined at Step S19 that the fingerprint collation is requested, the procedure goes on to Step S20, where the fingerprint is collated, and the fingerprint collation process is completed. The details of the fingerprint collation process are described later.

When it is determined at Step S19 that the fingerprint collation is not requested, the procedure is returned to Step S11 to repeat the above processes for the following fingerprint collation.

When it is determined at Step S14 that the object in contact with the fingerprint reading sensor 21 is not recognized as the finger 41, in other words, not the finger 41, it means that the finger 41 is not in contact with the fingerprint reading sensor 21. Thus, the procedure is returned to Step S11 to repeat the above processes for the following fingerprint collation.

Figure 22:
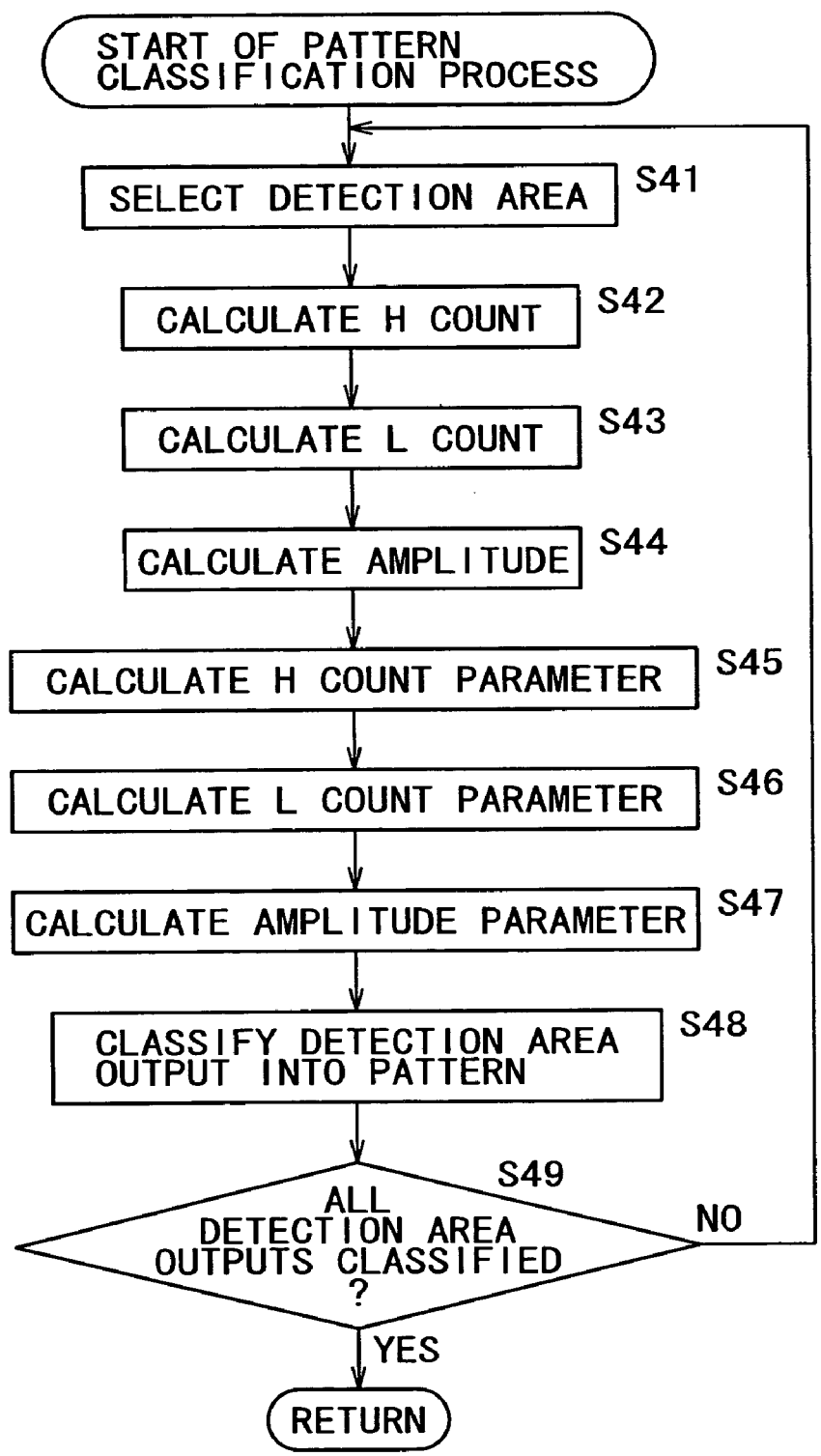
FIG. 22 is a flowchart showing the procedure of a pattern classification process.

The pattern classification process corresponding to the process at Step S12 is described in the following with reference to the flowchart of FIG. 22.

In the process at Step S41 of the fingerprint collation program, an available detection area is selected from a given number of detection areas.

In the process at Step S42 of the fingerprint collation program, the H count is calculated with reference to the finger positioning determination signal generated by the LSI for fingerprint reading 51 from the signal supplied from the fingerprint reading sensor 21. For instance, the fingerprint collation program calculates the H count by comparing the higher limit threshold stored in advance with the data contained in the detection area output to count the data of magnitude equal or above the higher limit threshold.

In the process at Step S43 of the fingerprint collation program, the L count is calculated with reference to the finger positioning determination signal generated by the LSI for fingerprint reading 51 from the signal supplied from the fingerprint reading sensor 21. For instance, the fingerprint collation program calculates the L count by comparing the lower limit threshold stored in advance with the data contained in the detection area output to count the data of magnitude equal or below the lower limit threshold.

In the process at Step S44 of the fingerprint collation program, the amplitude is calculated with reference to the finger positioning determination signal generated by the LSI for fingerprint reading 51 from the signal supplied from the fingerprint reading sensor 21. For instance, the fingerprint collation program obtains the maximum of the data contained in the detection area output to prescribe the range with reference to the maximum of the data contained in the detection area output. Then, the fingerprint collation program calculates the average detection area output of the fingerprint reading sensor 21 within the range prescribed with reference to the maximum.

Next, the fingerprint collation program obtains the minimum of the data contained in the detection area output to prescribe the range with reference to the minimum of the data contained in the detection area output. Then, the fingerprint collation program calculates the average detection area output of the fingerprint reading sensor 21 within the range prescribed with reference to the minimum.

In addition, the fingerprint collation program causes the CPU to specify, as the amplitude, the difference between the average detection area output within the range prescribed with reference to the maximum and the average detection area output within the range prescribed with reference to the minimum.

In the process at Step S45 of the fingerprint collation program, the H count parameter is calculated with reference to the H count and the H count threshold. For instance, the fingerprint collation program sets the H count parameter to 1 when the value of the H count obtained by the process at Step S42 is equal or above the H count threshold, with reference to the H count threshold stored in advance. On the other hand, when the value of the H count is less than the H count threshold, the H count parameter is set to 0. More specifically, the fingerprint collation program, with reference to the H count threshold specified as 10, sets the H count parameter to 1 when the value of the H count is equal or above 10. On the other hand, when the value of the H count is less than 10, the H count parameter is set to 0.

In the process at Step S46 of the fingerprint collation program, the L count parameter is calculated with reference to the L count and the L count threshold. For instance, the fingerprint collation program, with reference to the L count threshold stored in advance, sets the L count parameter to 1 when the value of the L count obtained by the process at Step S43 is equal or above the L count threshold. On the other hand, when the value of the L count is less than the L count threshold, the L count parameter is set to 0. More specifically, the fingerprint collation program, with reference to the L count threshold specified as 10, sets the L count parameter to 1 when the value of the L count is equal or above 10. On the other hand, when the value of the L count is less than 10, the L count parameter is set to 0.

In the process at Step S47 of the fingerprint collation program, the amplitude parameter is calculated with reference to the amplitude and the amplitude threshold. For instance, the fingerprint collation program, with reference to the amplitude threshold stored in advance, sets the amplitude parameter to 1 when the value of the amplitude obtained by the process at Step S44 is equal or above the amplitude threshold. On the other hand, when the value of the amplitude is less than the amplitude threshold, the amplitude parameter is set to 0. More specifically, the fingerprint collation program sets the amplitude parameter to 1 when the value of the amplitude value is equal or above 40, with reference to the amplitude threshold specified as 40. On the other hand, when the value of the amplitude is less than 40, the amplitude parameter is set to 0.

In the process at Step S48 of the fingerprint collation program, the detection area output is classified into either of a plurality of patterns with reference to the H count parameter, the L count parameter and the amplitude parameter. For instance, the fingerprint collation program classifies the detection area output into either of eight patterns with reference to a combination of the H count parameter, the L count parameter and the amplitude parameter. More specifically, for instance, the fingerprint collation program classifies the detection area output (data) into either pattern by generating numbers each specifying the pattern in a manner that combines 1-bit data of the H count parameter, the L count parameter and the amplitude parameter into 3-bit data consisting of the H count parameter, the L count parameter and the amplitude parameter in this order.

In the process at Step S49 of the fingerprint collation program, it is determined that all detection area outputs have been classified into either pattern or not. When it is determined that classification of all detection area outputs into either pattern has not been achieved, the procedure returns to Step S41, where a detection area is selected from the available detection areas to repeat the above processes for the following pattern classification.

When it is determined at Step S49 that all detection area outputs have been classified into either pattern, the pattern classification process is completed.

As described above, the data such as detection area output is classified into either pattern with reference to the number (H count) of data of magnitude equal or above a first threshold, the number (L count) of data of magnitude equal or below a second threshold and the difference (amplitude) between the output values determined with reference to the maximum (MAX) and the minimum (MIN) of the magnitude of data.

Figure 23:
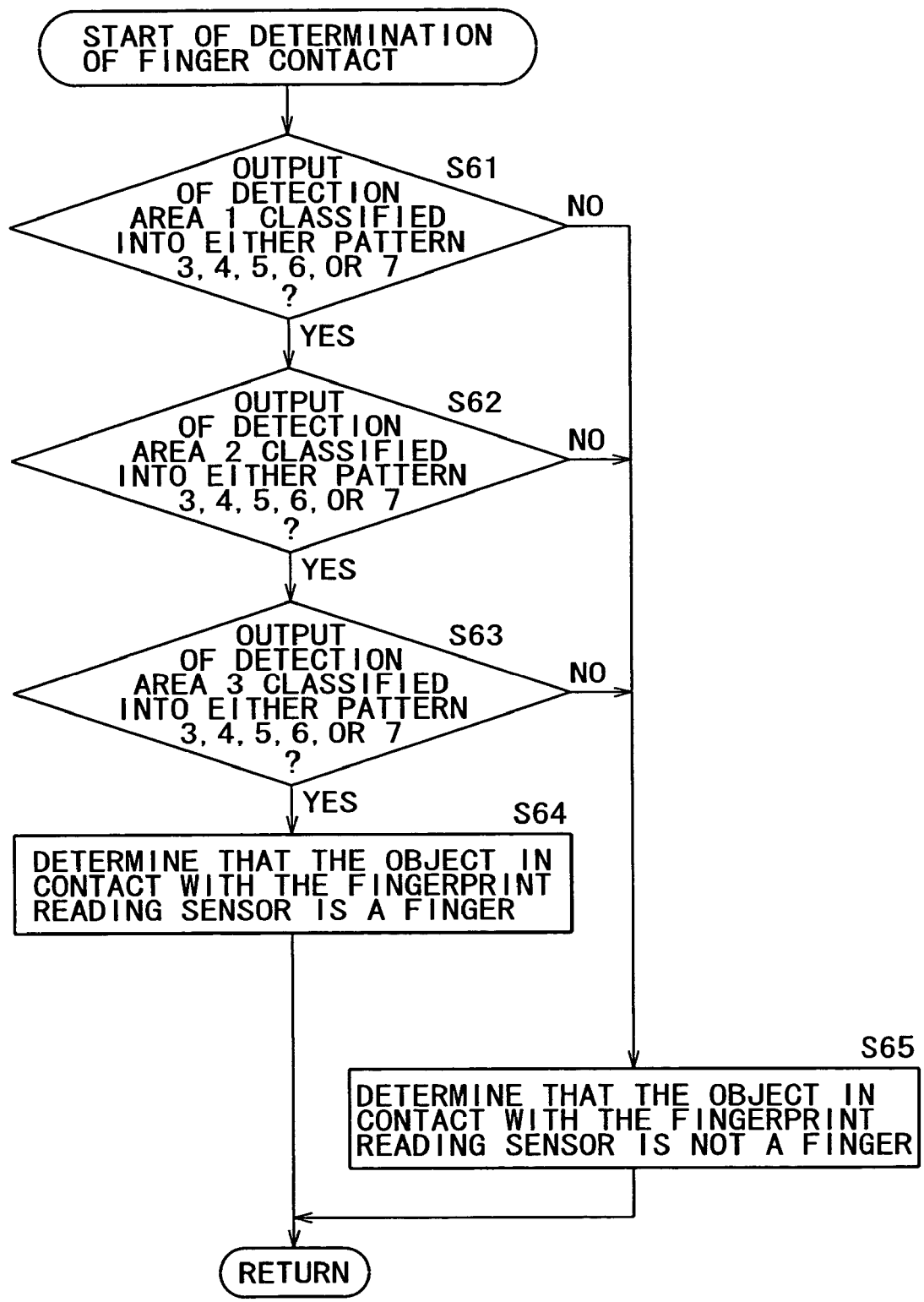
FIG. 23 is a flowchart showing the procedure of a finger contact determination process.

The finger contact determination process corresponding to the process at Step S13 is described in the following with reference to a flowchart of FIG. 23.

In the process at Step S61 of the fingerprint collation program, it is determined that the output of the detection area 1 is classified into either pattern 3, 4, 5, 6 or 7 or not. When it is determined that the output of the detection area 1 has been classified into either pattern 3, 4, 5, 6 or 7, the procedure goes on to Step S62.

In the process at Step S62 of the fingerprint collation program, it is determined that the output of the detection area 2 is classified into either pattern 3, 4, 5, 6 or 7 or not. When it is determined that the output of the detection area 2 has been classified into either pattern 3, 4, 5, 6 or 7, the procedure goes on to Step S63.

In the process at Step S63 of the fingerprint collation program, it is determined that the output of the detection area 3 is classified into either pattern 3, 4, 5, 6 or 7 or not. When it is determined that the output of the detection area 3 has been classified into either pattern 3, 4, 5, 6 or 7, the procedure goes on to Step S64.

Since it is determined that classification of the outputs of all the detection areas 1, 2 and 3 into either pattern 3, 4, 5, 6 or 7 has been achieved, the fingerprint collation program determines at Step S64 that the object in contact with the fingerprint reading sensor 21 is the finger 41, and the finger contact determination process is completed.

When it is determined at Step S61 that classification of the output of the detection area 1 into either pattern 3, 4, 5, 6 or 7 has not been achieved, in other words, the output of the detection area 1 has been classified into either pattern 0, 1 or 2, it means that the finger 41 is not in contact with the fingerprint reading sensor 21 or the object other than the finger 41 is in contact with the fingerprint reading sensor 21. Thus, the procedure goes on to Step S65, where the fingerprint collation program determines that the object in contact with the fingerprint reading sensor 21 is not the finger 41, and the finger contact determination process is completed.

When it is determined at Step S62 that classification of the output of the detection area 2 into either pattern 3, 4, 5, 6 or 7 has not been achieved, in other words, the output of the detection area 2 has been classified into either pattern 0, 1 or 2, it means that the finger 41 is not in contact with the fingerprint reading sensor 21, or the object other than the finger 41 is in contact with the fingerprint reading sensor 21. Thus, the procedure goes on to Step S65, where the fingerprint collation program determines that the object in contact with the fingerprint reading sensor 21 is not the finger 41, and the finger contact determination process is completed.

When it is determined at Step S63 that classification of the output of the detection area 3 into either pattern 3, 4, 5, 6 or 7 has not been achieved, in other words, the output of the detection area 3 has been classified into either pattern 0, 1 or 2, it means that the finger 41 is not in contact with the fingerprint reading sensor 21 or the object other than the finger 41 is in contact with the fingerprint reading sensor 21. Thus, the procedure goes on to Step S65, where the fingerprint collation program determines that the object in contact with the fingerprint reading sensor 41 is not the finger 41, and the finger contact determination process is completed.

It is noted that the number of detection areas is by no means limited to three as described above so that, alternatively, the number of detection areas may be arbitrarily determined.

As described above, the fingerprint collation apparatus 1 according to the present invention is configured to determine that the finger 41 is in contact with the fingerprint reading sensor 21 or not by effecting pattern classification with reference to the number of data close to the higher limit H and the number of data close to the lower limit L among the data contained in the output from the fingerprint reading sensor 21, together with the amplitude. Thus, the contact of the finger 41 with the fingerprint reading sensor 21 or not may be determined securely in a stable manner. As a result, the fingerprint collation apparatus 1 according to the preferred embodiment of the present invention makes it possible to securely read the fingerprint image.

In cases where signals from the sensor are processed as described above, determination of the contacting object may be achieved. In particular, it is possible to carry out fingerprint collation.

Also, the contact of the finger with the sensor may be detected securely in cases where the data is classified into either prescribed pattern to determine the object in contact with the sensor with reference to the classified patterns, using the number of data of magnitude equal or above the first threshold, the number of data of magnitude equal or below the second threshold and the difference between the output values determined with reference to the maximum and the minimum of the magnitude of data, all of which are obtained in the data supplied from the sensor for outputting the data of magnitude corresponding to the capacitance of each of the capacitors created in a plurality of sampling points with the contacting object.

The fingerprint registration and fingerprint collation processes are described in the following.

Figure 18:
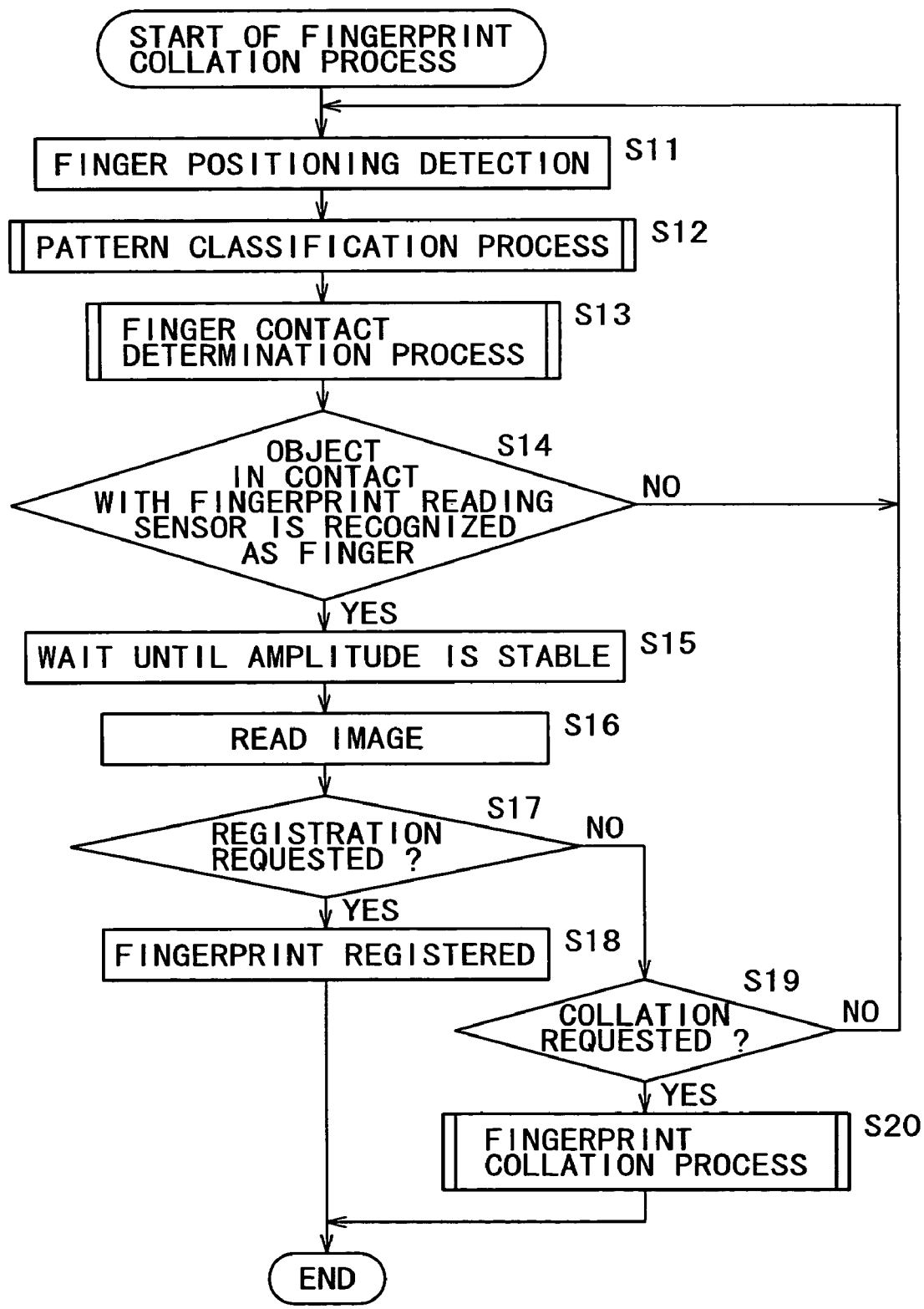
FIG. 18 is a flowchart showing the procedure of a fingerprint collation process.

In the fingerprint image reading process as described at Step S16 of FIG. 18, the LSI for fingerprint reading 51 subjects the signal supplied from the fingerprint reading sensor 21 for each metal electrode 103 to analog-to-digital-conversion, and further converts a resultant digital signal into a binary fingerprint image. The LSI for fingerprint reading 51 supplies the generated binary fingerprint image to the CPU 52.

Figure 24:
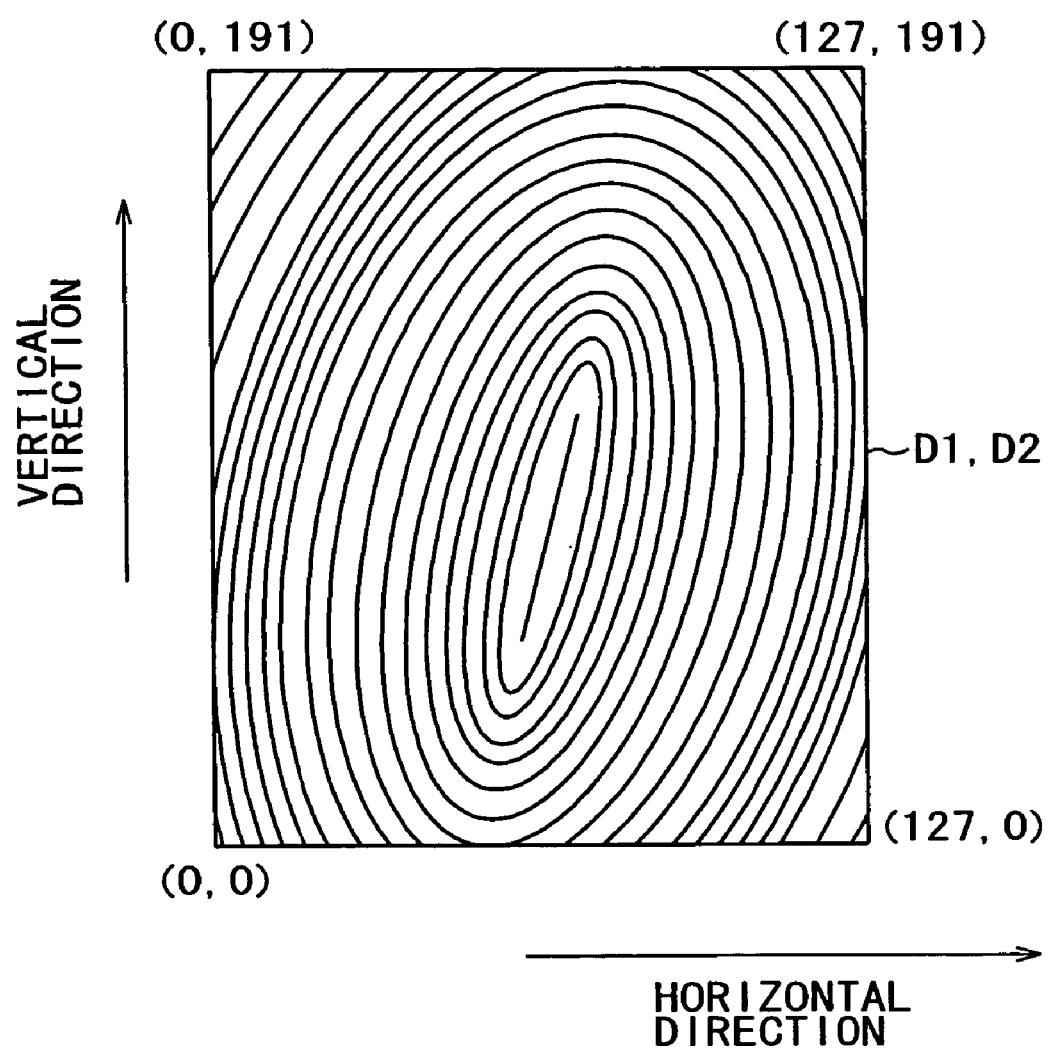
FIG. 24 is a schematic diagram illustrating a binary fingerprint image.

FIG. 24 is a schematic diagram illustrating the binary fingerprint image generated by the LSI for fingerprint reading 51. As shown in FIG. 24, the binary fingerprint image includes 128 pixels in a horizontal direction and 192 pixels in a vertical direction.

In the following description, a fingerprint image to be registered is referred to as fingerprint data D1, and a fingerprint image to be collated is referred to as fingerprint data D2.

The fingerprint registration process as described at Step S18 of FIG. 18 is detailed in the following.

The CPU 52 causes the flash memory 54 to hold user data registered in advance for users, and, for each user data, registered data extracted from the fingerprint data D1 read from the user's fingerprint.

As shown in FIG. 25, the flash memory 54 holds the user ID registered for each registered user data, and, for each user ID, nine lines of horizontal direction registered data D1H0 to D1H8 and nine lines of vertical direction registered data D1V0 to D1V8. The flash memory 54 also holds position information specifying horizontal and vertical positions on the fingerprint image for each of the horizontal direction registered data D1H0 to D1H8 and the vertical direction registered data D1V0 to D1V8. The position information has coordinates (X0, Y0), (X0, Y1), (X0, Y4), (X0, Y8), (X0, Y0), (X1, Y0), (X4, Y0) and (X8, Y0) as shown in FIG. 25, for instance.

Figure 26:
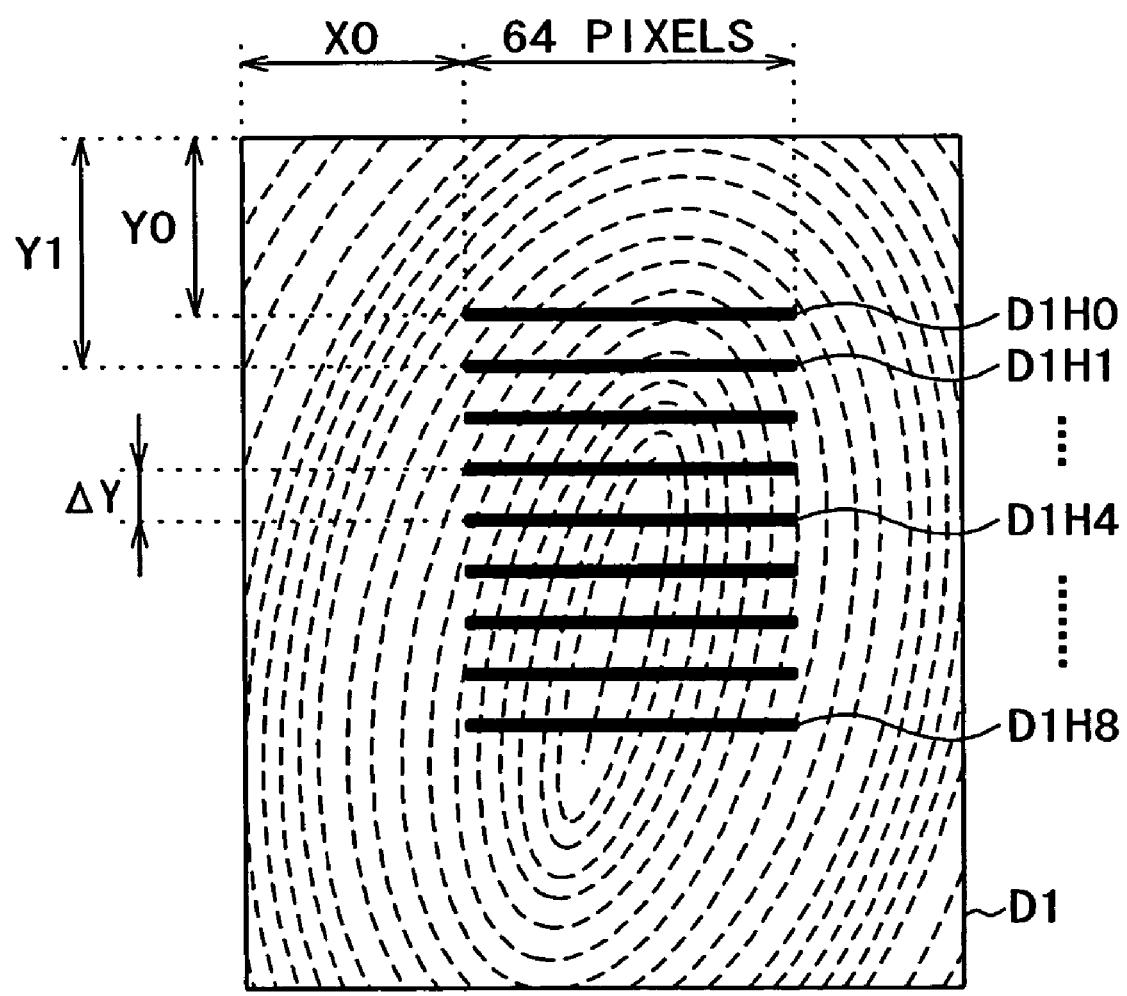
FIG. 26 is a schematic diagram illustrating the horizontal direction registered data D1H0 to D1H8.

The horizontal direction registered data D1H0 here has a horizontal row of 64 pixels extracted from the pixels of the image of the fingerprint data D1, as shown in FIG. 26. Likewise, each of the horizontal direction registered data D1H1 to D1H8 has a different horizontal row of 64 pixels extracted from the pixels of the image of the fingerprint data D1, as shown in FIG. 26.

The position information corresponding to the horizontal direction registered data D1H0 has coordinates specifying the position of each pixel contained in the horizontal direction registered data D1H0 on the image of the fingerprint data D1. For instance, the position information (X0, Y0) corresponding to the horizontal direction registered data D1H0 has coordinates specifying the position of a leftmost pixel among the pixels contained in the horizontal direction registered data D1H0 on the image of the fingerprint data D1.

Likewise, the position information corresponding to each of the horizontal direction registered data D1H1 to D1H8 has coordinates specifying the position of each pixel contained in each of the horizontal direction registered data D1H1 to D1H8 on the image of the fingerprint data D1.

As a result, the flash memory 54 holds a total of nine pixel data each consisting of 1 pixel in the vertical direction and 64 pixels in the horizontal direction, with a total of nine position data on the images each consisting of 1 pixel in the vertical direction and 64 pixels in the horizontal direction, all of which are extracted from each registered fingerprint image, which is an image to be collated.

Figure 27:
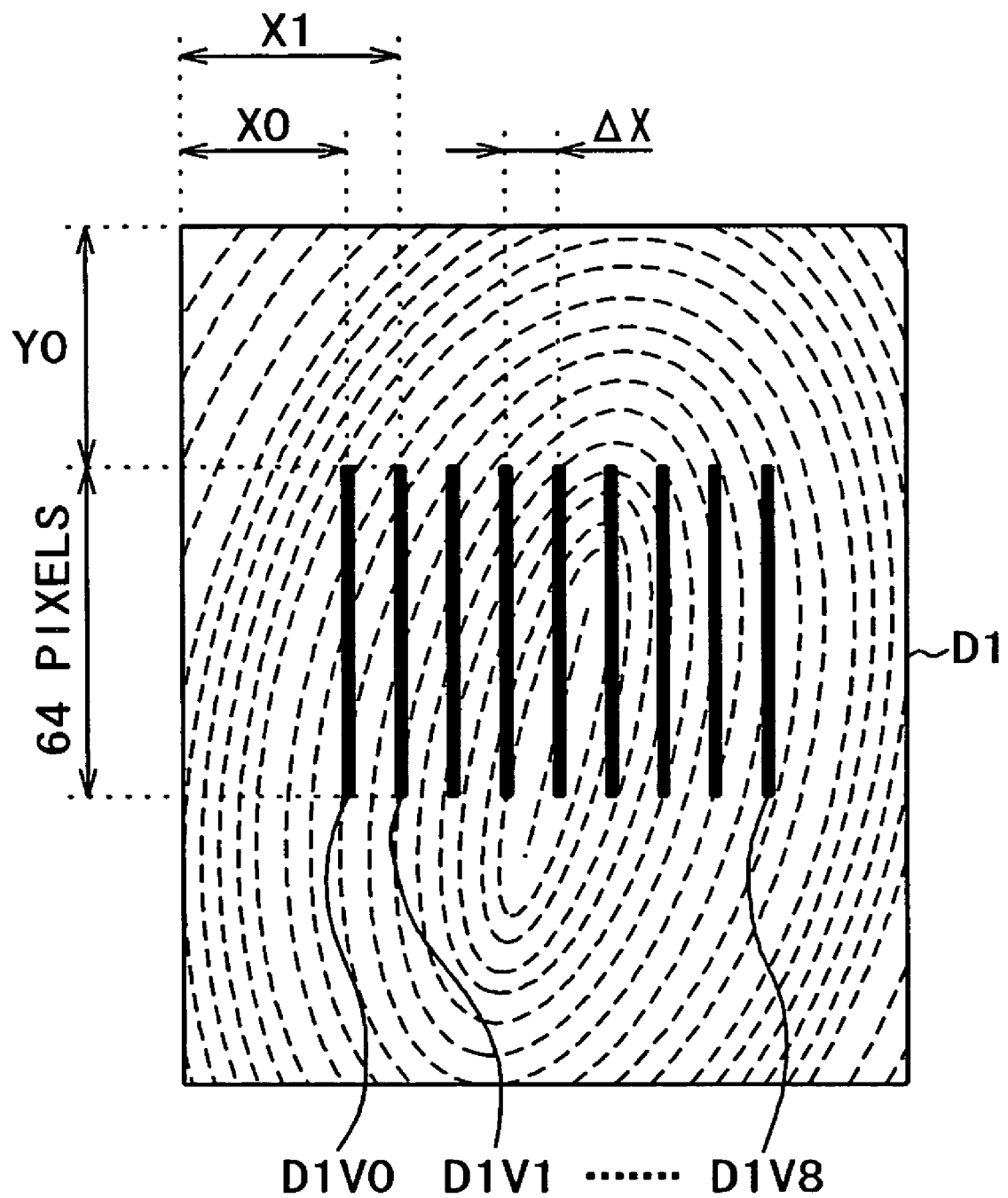
FIG. 27 is a schematic diagram illustrating the vertical direction registered data D1V0 to D1V8.

On the other hand, the vertical direction registered data D1V0 has a vertical row of 64 pixels extracted from the pixels of the image of the fingerprint data D1 as shown in FIG. 27. Likewise, each of the vertical direction registered data D1V1 to D1V8 has a different vertical row of 64 pixels extracted from the pixels of the image of the fingerprint data D1, as shown in FIG. 27.

The position information corresponding to the vertical direction registered data D1V0 has coordinates specifying the position of each pixel contained in the vertical direction registered data D1V0 on the image of the fingerprint data D1. For instance, the position information (X0, Y0) corresponding to the vertical direction registered data D1V0 has coordinates specifying the position of an uppermost pixel among the pixels contained in the vertical direction registered data D1V1 on the image of the fingerprint data D1.

Likewise, the position information corresponding to each of the vertical direction registered data D1V1 to D1V8 has coordinates specifying the position of each pixel contained in each of the vertical direction registered data D1V1 to D1V8 on the image of the fingerprint data D1.

Thus, the flash memory 54 holds a total of nine pixel data each consisting of 1 pixel in the horizontal direction and 64 pixels in the vertical direction, with a total of nine position data on the images each consisting of 1 pixel in the horizontal direction and 64 pixels in the vertical direction, all of which are extracted from each registered fingerprint image, which is the image to be collated In the above preferred embodiment of the present invention, the horizontal direction registered data D1H0 to D1H8 respectively specifying feature portions of the fingerprint data D1 is extracted from the fingerprint data D1 at prescribed intervals such as ΔY. The vertical direction registered data D1V0 to D1V8 respectively specifying the feature portions of the fingerprint data D1 is extracted from the fingerprint data D1 at prescribed intervals such as ΔX. The horizontal direction registered data D1H0 to D1H8 and the vertical direction registered data D1V0 to D1V8 are also referred to as a fingerprint template.

Figure 28:
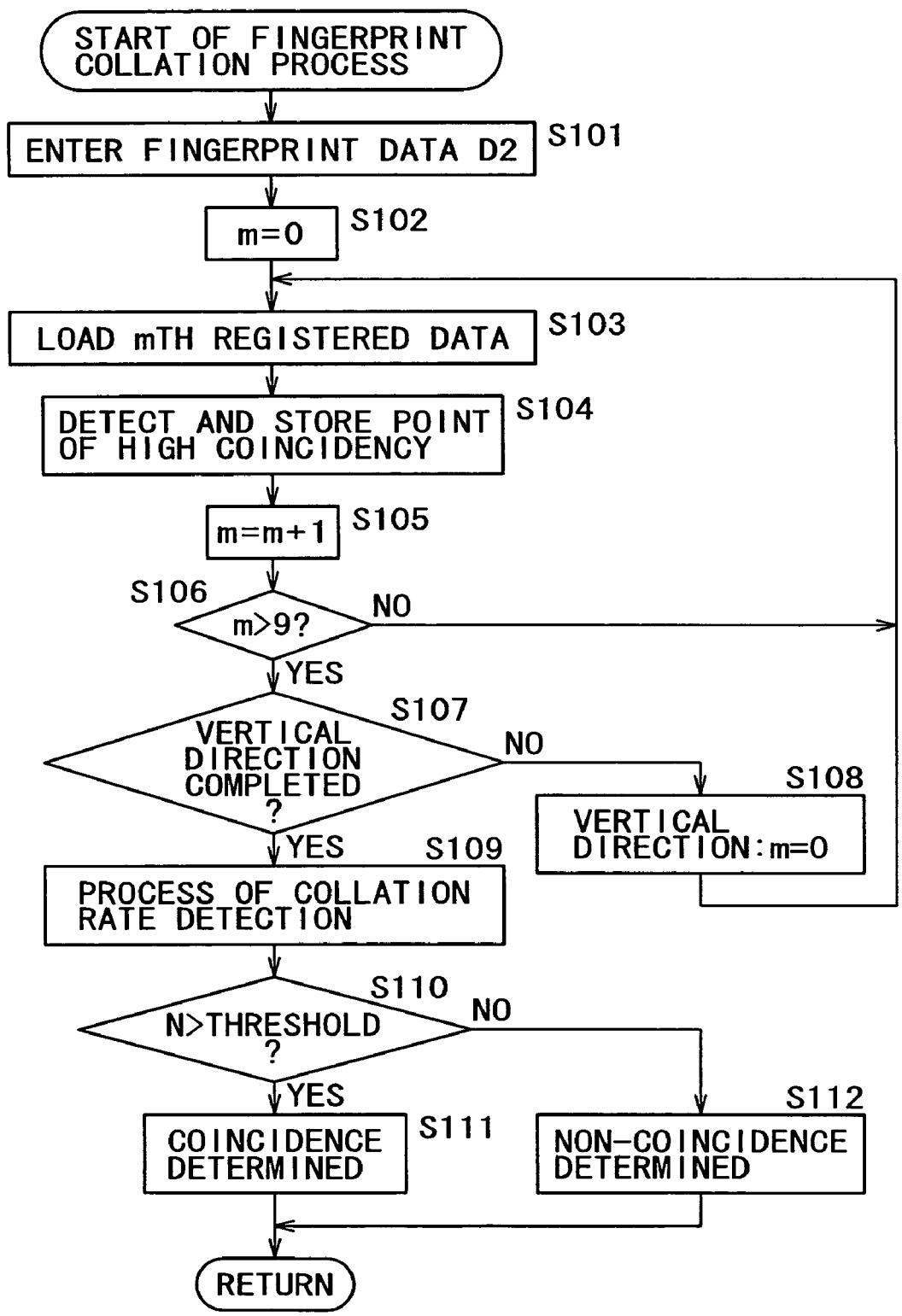
FIG. 28 is a flowchart showing the procedure of a fingerprint collation process.

The fingerprint collation process corresponding to the process at Step S20 is described in the following with reference to a flowchart of FIG. 28.

In the process at Step S101 of the fingerprint collation program, upon entry of a request for fingerprint collation, the fingerprint data D2 is entered from the LSI for fingerprint reading 51. The LSI for fingerprint reading 51, for instance, subjects the signal supplied from the fingerprint reading sensor 21 for each metal electrode 103 to analog-to-digital conversion, and further converts a resultant digital signal into a binary fingerprint image. The LSI for fingerprint reading 51 then supplies the generated binary fingerprint image as the fingerprint data D2 to the fingerprint collation program. Then, the fingerprint collation program enters the fingerprint data D2 generated by the LSI for fingerprint reading 51. The fingerprint collation program allows a prescribed RAM region of the RAM/ROM for program 53 to hold the entered fingerprint data D2.

In the process at Step S102 of the fingerprint collation program, a variable m is set to 0. The variable m herein is a variable that specifies 9×2 data D1H0 to D1H8 per user registered in a fingerprint database 5 with respect to the user ID.

In the process at Step S103 of the fingerprint collation program to be executed first, the horizontal direction registered data D1H0 of the m-th horizontal direction registered data corresponding to the user ID is loaded from the flash memory 54 into the prescribed RAM region of the RAM/ROM for program 53, with reference to the user ID entered from the outside through the USB controller 55.

In the process at Step S104 of the fingerprint collation program, a degree of coincidence DMH0 is detected in each position of the image designated by the fingerprint data D2, while raster-scanning the image designated by the fingerprint data D2 with the horizontal direction registered data D1H0 of the m-th horizontal direction registered data having been loaded into the RAM/ROM for program 53.

Figure 29:
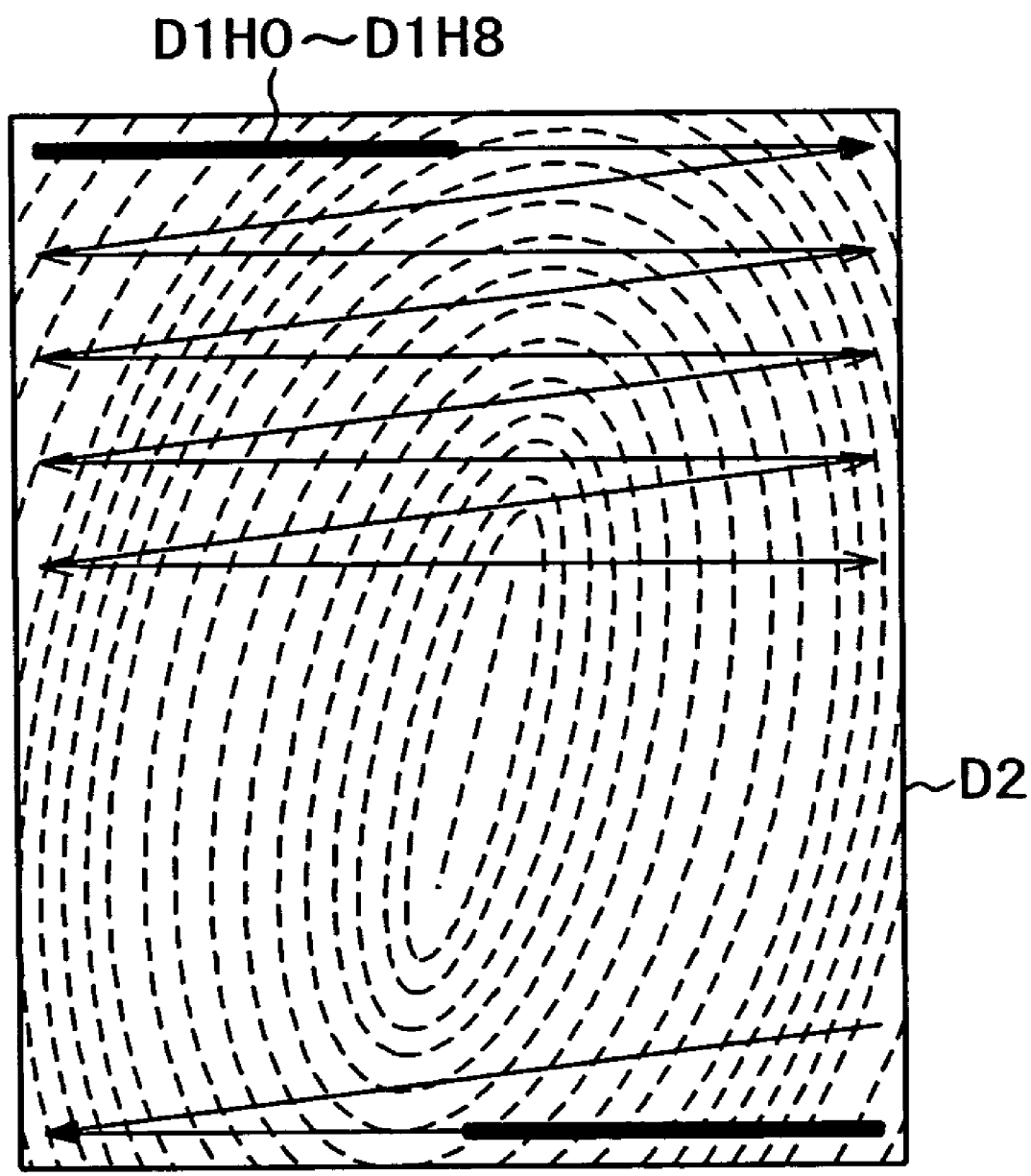
FIG. 29 is a schematic diagram illustrating a process to detect pixel-by-pixel coincidence between fingerprint data D2 and the horizontal direction registered data D1H0 to D1H8.
Figure 30:
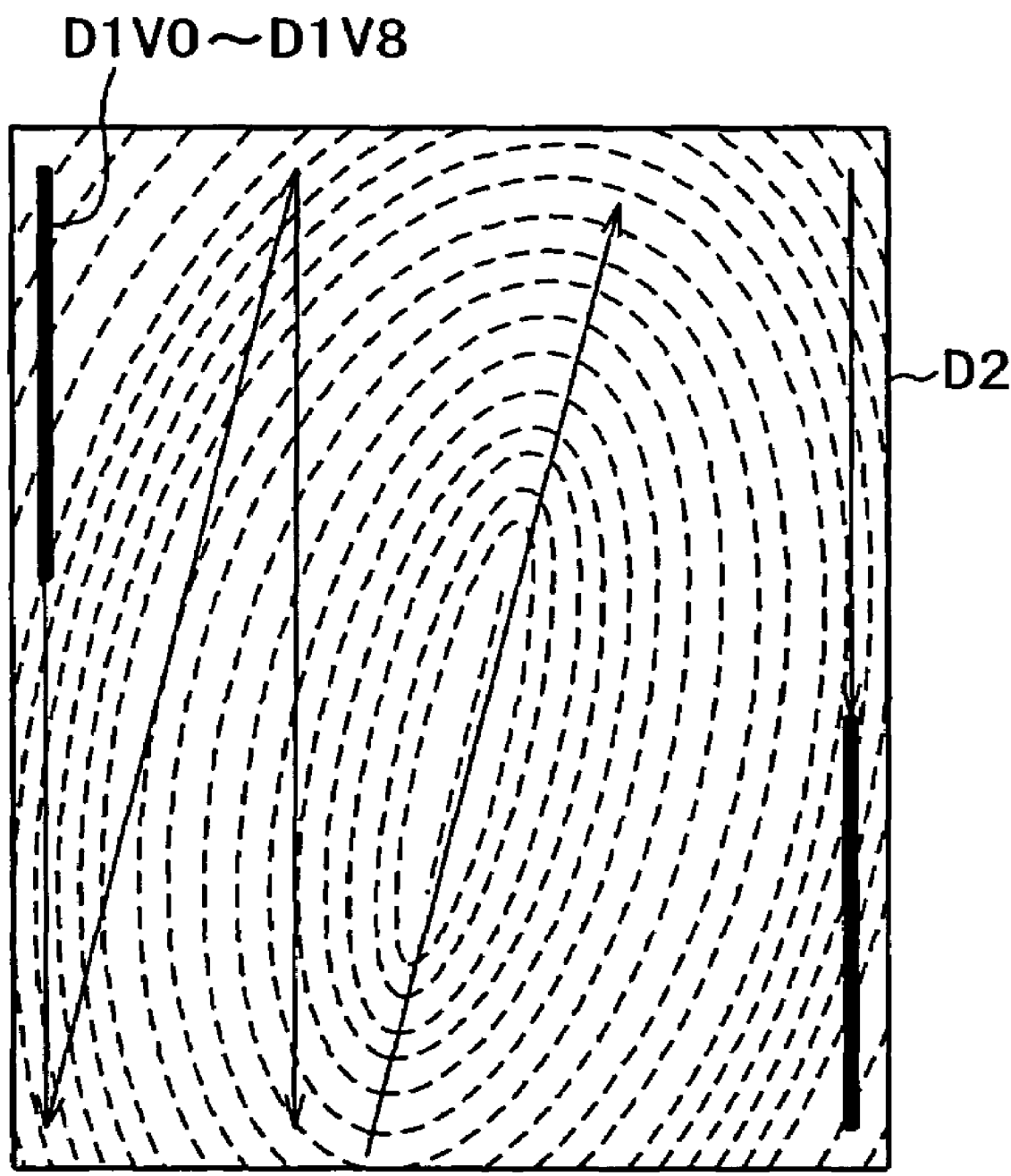
FIG. 30 is a schematic diagram illustrating a process to detect pixel-by-pixel coincidence between fingerprint data D2 and the vertical direction registered data D1V0 to D1V8.

For example, as shown in FIG. 29, the fingerprint collation program detects the presence of pixel-by-pixel coincidence between the portion consisting of 1 pixel in the vertical direction and 64 pixels in the horizontal direction in the image of the fingerprint data D2 and the horizontal direction registered data D1H01 in order of raster scanning. The number of pixels of pixel-by-pixel coincidence between the portion consisting of 1 pixel in the vertical direction and 64 pixels in the horizontal direction in the image of the fingerprint data D2 and the horizontal direction registered data D1H0, and the number of pixels contained in the horizontal direction registered data D1H0 are set to the degree of coincidence DMH0 in each position of a portion of the fingerprint data S2. When it is assumed that the number of pixels of pixel-by-pixel coincidence is 62, and the horizontal direction registered data D1H0 has 64 pixels, for instance, 62/64 is set as the degree of coincidence DMH0.

Further, the fingerprint collation program detects a group of the degrees of coincidence DMH0 equal or above a prescribed threshold by comparing sequentially the detected degree of coincidence DMH0 in each position of the image designated by the fingerprint data D2 with the prescribed threshold. The fingerprint collation program then stores, in the RAM/ROM for program 53, the detected group of the degrees of coincidence DMH0 equal or above the prescribed threshold, together with the corresponding coordinates specifying each position of the portion of the fingerprint data D2.

In the process at Step S105 of the fingerprint collation program, the variable m is incremented. In the process at Step S106 of the fingerprint collation program, it is determined whether the variable m has surpassed a value of 9 or not. When it is determined that the variable m has not surpassed the value of 9, it means that the horizontal direction registered data D1H0 to D1H8 contains data that has not been subjected to detection of the degree of coincidence. Thus, the procedure is returned to Step S103 to repeat the above processes for the following horizontal direction registered data corresponding to the variable m.

When it is determined at Step S106 that the variable m has surpassed the value 9, it means that detection of the degree of coincidence is completed for all the horizontal direction registered data D1H0 to D1H8. Then, the procedure goes on to Step S107, where the fingerprint collation program determines that detection of the degree of coincidence regarding all the vertical direction registered data D1V0 to D1V8 is completed or not. When it is determined that detection of the degree of coincidence regarding all the vertical direction registered data is not completed, the procedure goes to Step S108, where an object of the process is switched to the vertical direction registered data D1V0 to D1V8, and the procedure is returned to Step S103 with the variable m reset to 0 to repeat the above processes for detection of the degree of coincidence regarding the vertical direction registered data corresponding to the variable m.

For instance, when the variable m is assumed to be 0, the fingerprint collation program detects the presence of pixel-by-pixel coincidence between the portion consisting of 1 pixel in the horizontal direction and 64 pixels in the vertical direction in the image of the fingerprint data D2 and the vertical direction registered data D1V0 in order of raster scanning. The number of pixels of pixel-by-pixel coincidence between the portion consisting of 1 pixel in the horizontal direction and 64 pixels in the vertical direction in the image of the fingerprint data D2 and the vertical direction registered data D1V0, and the number of pixels contained in the vertical direction registered data D1V0 are set to the degree of coincidence DMV0 in each position of a portion of the fingerprint data D2. When it is assumed that the number of pixels of pixel-by-pixel coincidence is 40 and the vertical direction registered data D1V0 has 64 pixels, for instance, 40/64 is set as the degree of coincidence DMV0.

Further, the fingerprint collation program detects a group of the degrees of coincidence DMV0 equal or above a prescribed threshold by sequentially comparing the detected degree of coincidence DMV0 in each position of the image designated by the fingerprint data D2 with the prescribed threshold. The fingerprint collation program then stores, in the RAM/ROM for program 53, the detected group of the degrees of coincidence equal or above the prescribed threshold, together with the corresponding coordinates specifying each position of the portion of the fingerprint data D2.

Figure 31:
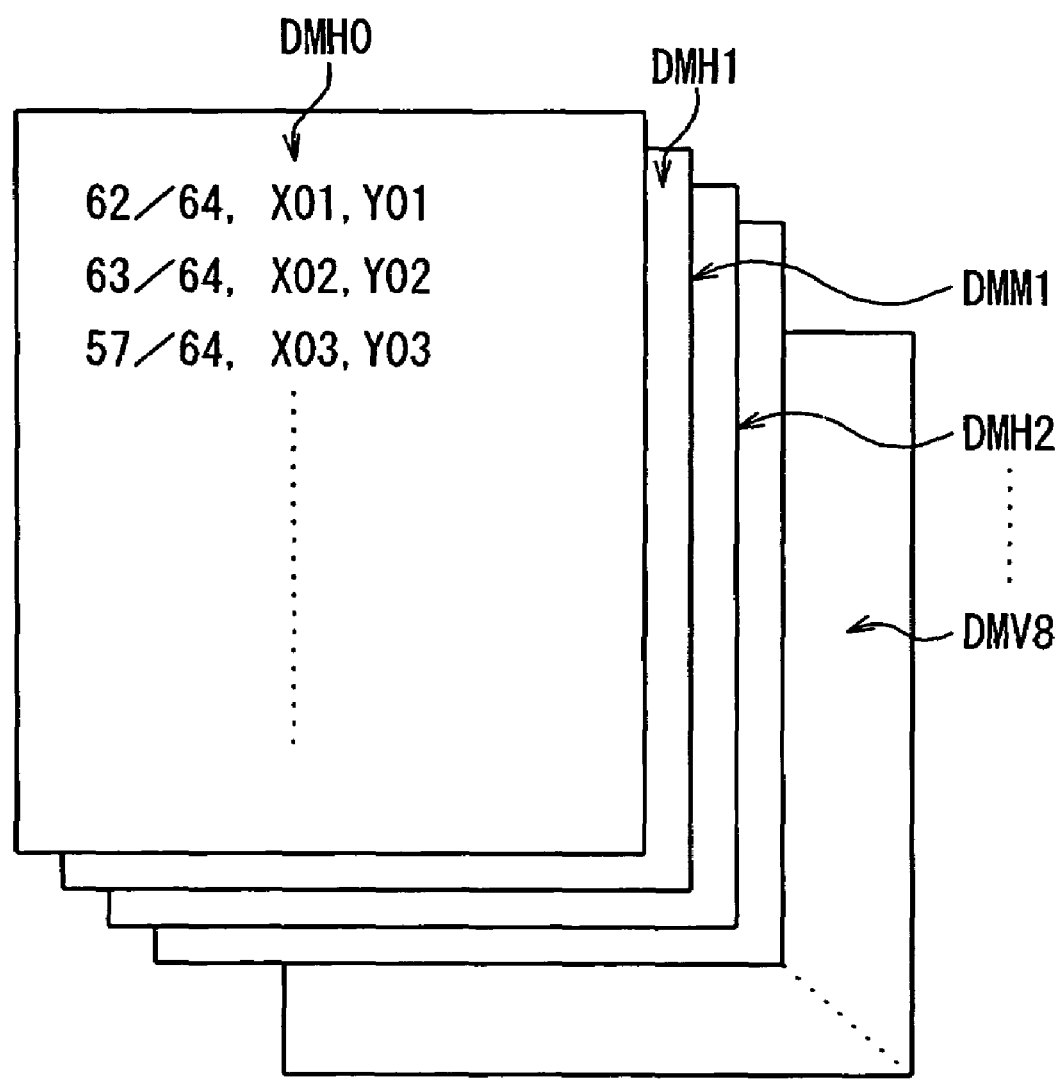
FIG. 31 is a schematic diagram illustrating distributions of degrees of coincidence.

The process at Step S104 is repeatedly executed regarding all the horizontal direction registered data D1H0 to D1H8 and the vertical direction registered data D1V0 to D1V8 as described above to thereby ensure that the groups of the degrees of coincidence DMH0 to DMV8 (for instance, 62/64, 63/64, 57/64 . . . ) equal or above the prescribed threshold are stored in the RAM/ROM for program 53 separately for the horizontal direction registered data D1H0 to D1H8 and the vertical direction registered data D1V0 to D1V8, together with the corresponding coordinates (for instance, (X01, Y01), (X02, Y02), (X03, X03) . . . ), as shown for instance in FIG. 31. In the following description, the group of the degrees of coincidence DMH0 to DMV8 equal or above the prescribed threshold and the corresponding coordinates are referred to as a distribution of the degrees of coincidence.

When it is determined at Step S107 that the degree of coincidence has been detected regarding all the vertical direction registered data, it means that detection of the degree of coincidence regarding all the registered data is completed. Thus, the procedure goes on to Step S109, where the fingerprint collation program executes a collation rate detection process. The details of the collation rate detection process are described later.

In the process at Step S110 of the fingerprint collation program, it is determined whether a collation rate N obtained by the collation rate detection process is above a prescribed threshold or not. When it is determined that the collation rate N is above the prescribed threshold, the procedure goes on to Step S111, where a result of determination representing coincidence of the fingerprint is outputted through the USB controller 55, and the fingerprint collation process is completed.

When it is determined at Step S110 that the collation rate N is equal or below the prescribed threshold, the procedure goes on to Step S112, where a result of determination representing non-coincidence of the fingerprint is outputted through the USB controller 55, and the fingerprint collation process is completed.

Figure 32:
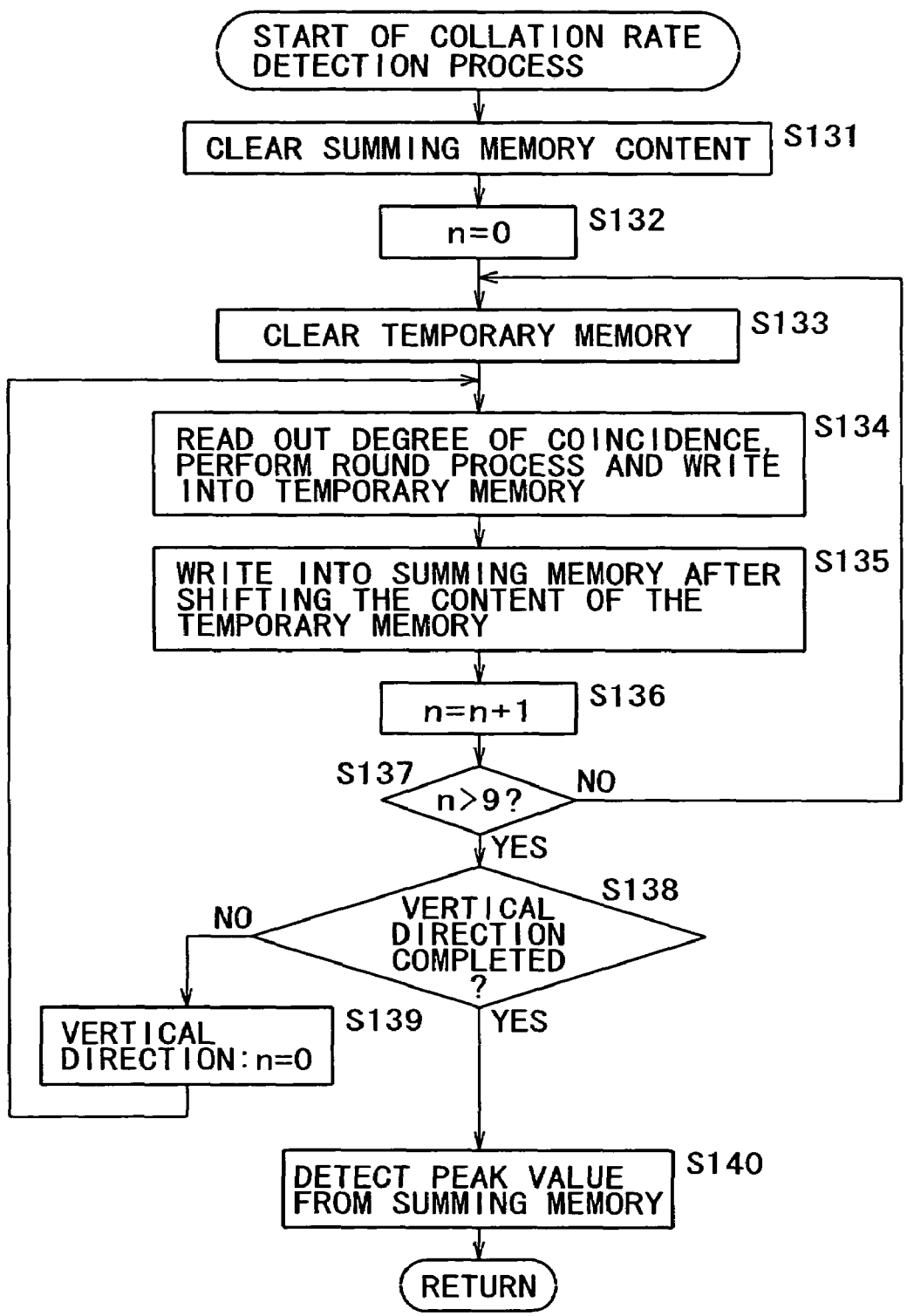
FIG. 32 is a flowchart showing the procedure of a collation rate detection process.

The collation rate detection process corresponding to the process at Step S109 is described in the following with reference to a flowchart of FIG. 32.

In the process at Step S131 of the fingerprint collation program, a summing memory content that is the prescribed region of the RAM/ROM for program 53 is cleared. In the process at Step S132 of the fingerprint collation program, a variable n is set to 0. The variable n is a variable that specifies the degrees of coincidence stored in the RAM/ROM for program 53. In the process at Step S133 of the fingerprint collation program, a temporary memory content that is the prescribed region of the RAM/ROM for program 53 is cleared.

In the process at Step S134 of the fingerprint collation program, the distributions of the degrees of coincidence designated by the variable n are rounded and written into the temporary memory.

Figure 33:
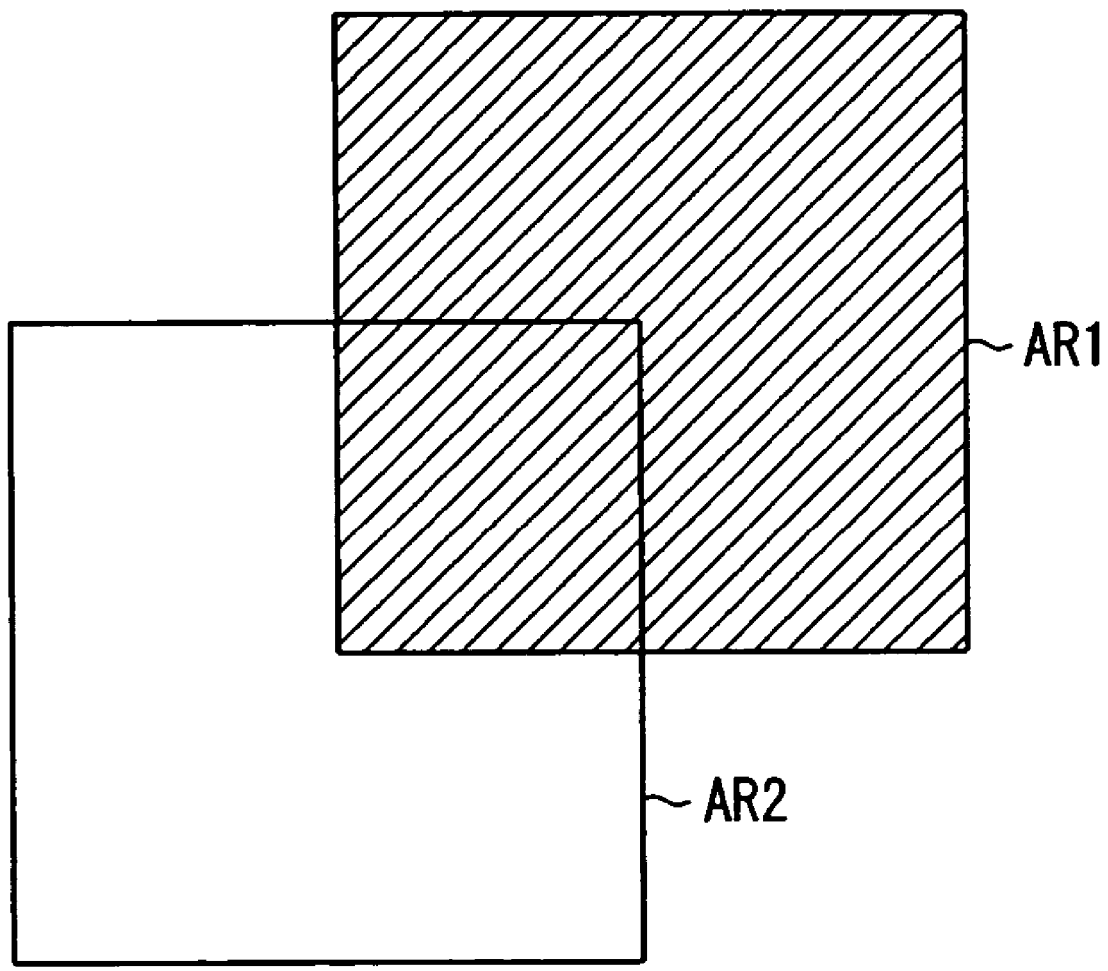
FIG. 33 is a schematic diagram illustrating a state in which an area AR1 and an area AR2 overlap each other.

Specifically, the fingerprint collation program reads out the degree of coincidence DMH0 contained in the distribution of the degrees of coincidence with respect to the distributions of the degrees of coincidence (which has the detected group of the degrees of coincidence equal or above the prescribed threshold with respect to the horizontal direction registered data D1H0 and the corresponding coordinates, when the variable n is assumed to be 0) specified by the variable n in sequence from the RAM/ROM for program 53 and to update, to the read-out degree of coincidence DMH0, other degrees of coincidence DMH0 contained in the area AR that is a prescribed area around the position specified by the coordinates corresponding to the degree of coincidence DMH0. As shown in FIG. 33, according to the fingerprint collation program, if the degrees of coincidence DMH0 equal or above the prescribed threshold are so close that prescribed areas such as areas AR1 and AR2 around the position specified by the coordinates corresponding to the mutually close degrees of coincidence DMH0 overlap, a higher degree of coincidence DMH0 is assigned to this overlapping part.

Figure 34:
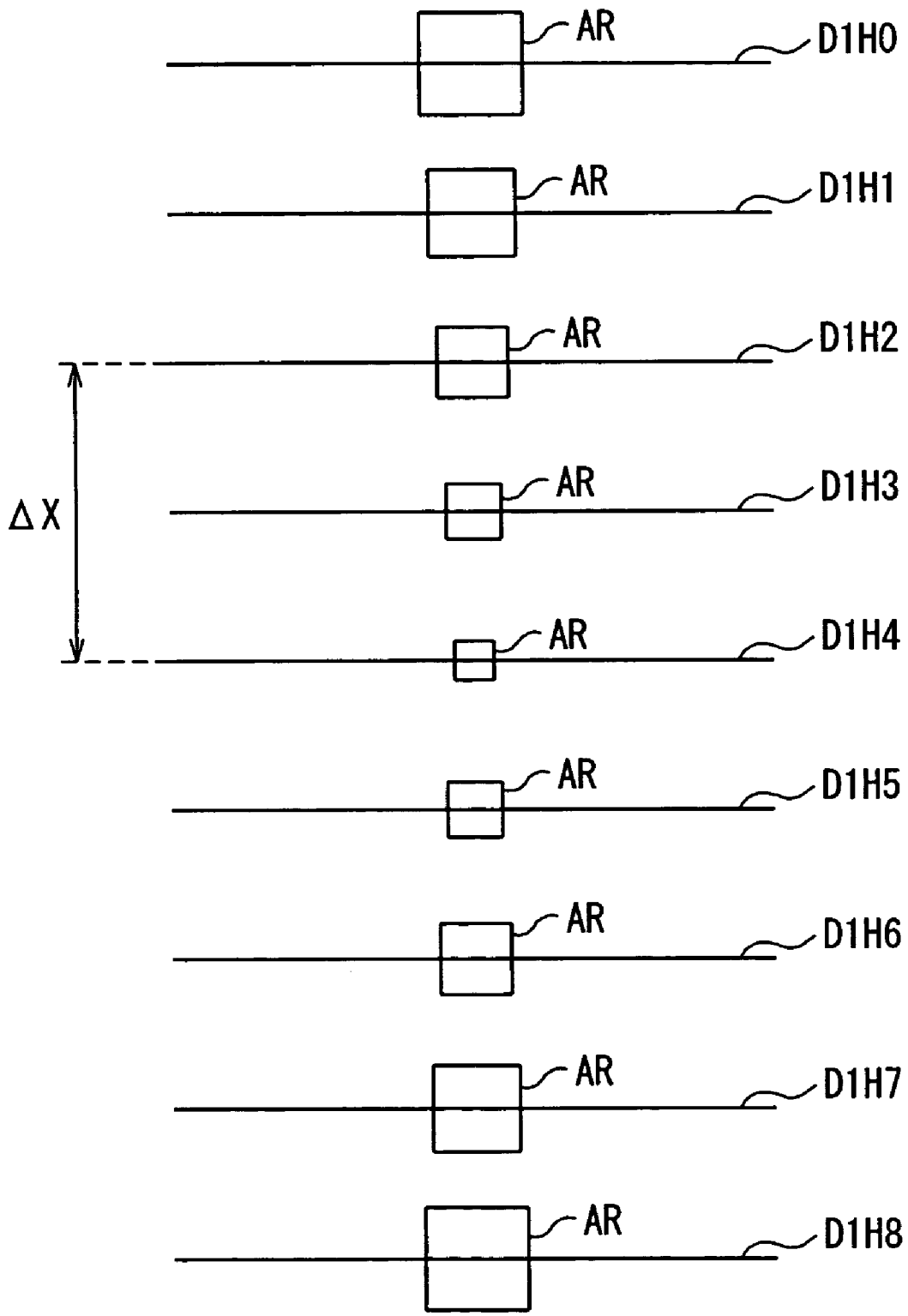
FIG. 34 is a schematic diagram illustrating sizes of areas AR.

Further, as shown in FIG. 34, the fingerprint collation program causes updating of the group of the degrees of coincidence DMH0 such that, with the central one (the horizontal direction registered data D1H4) out of the nine lines of linear images of the horizontal direction registered data D1H0 to D1H8 as reference, the area AR for updating this group of the degrees of coincidence DMH0 expands as its distance from the central linear image increases.

Figure 35:
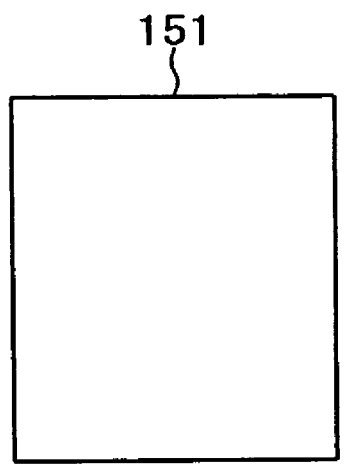
FIG. 35 is a schematic diagram illustrating a process to write data in a temporary memory into a summing memory.
Figure 36:
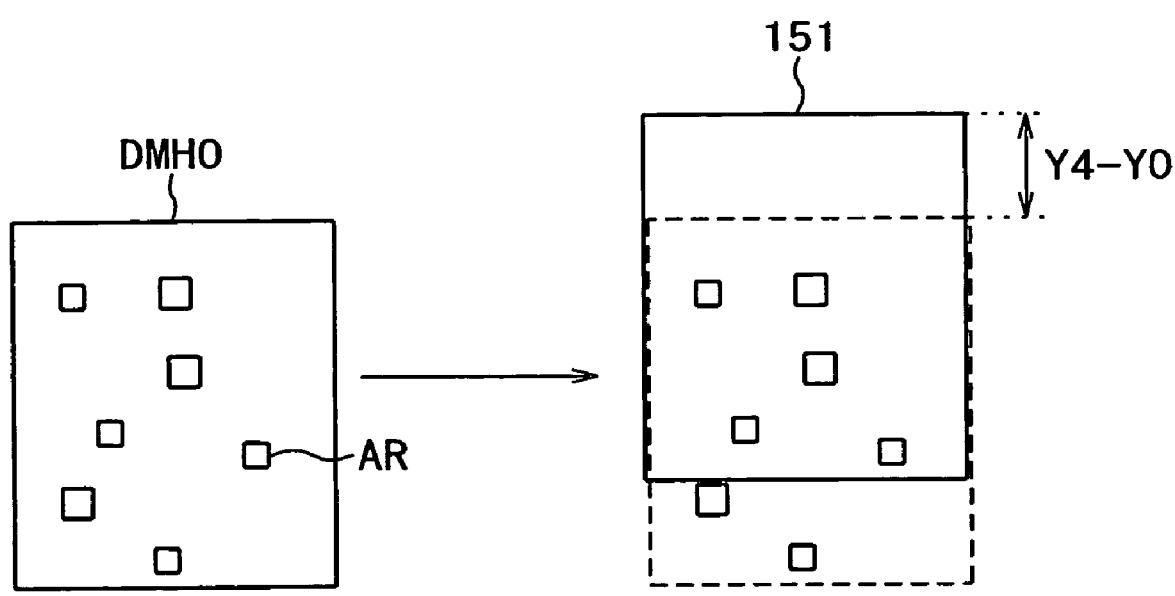
FIG. 36 is a schematic diagram illustrating the process to write data in the temporary memory into the summing memory.
Figure 37:
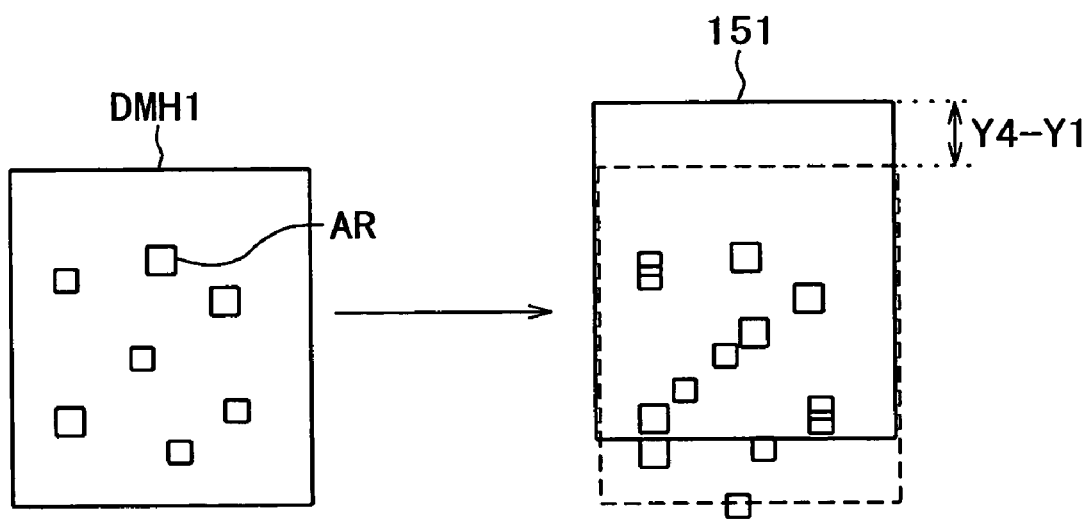
FIG. 37 is a schematic diagram illustrating the process to write data in the temporary memory into the summing memory.
Figure 38:
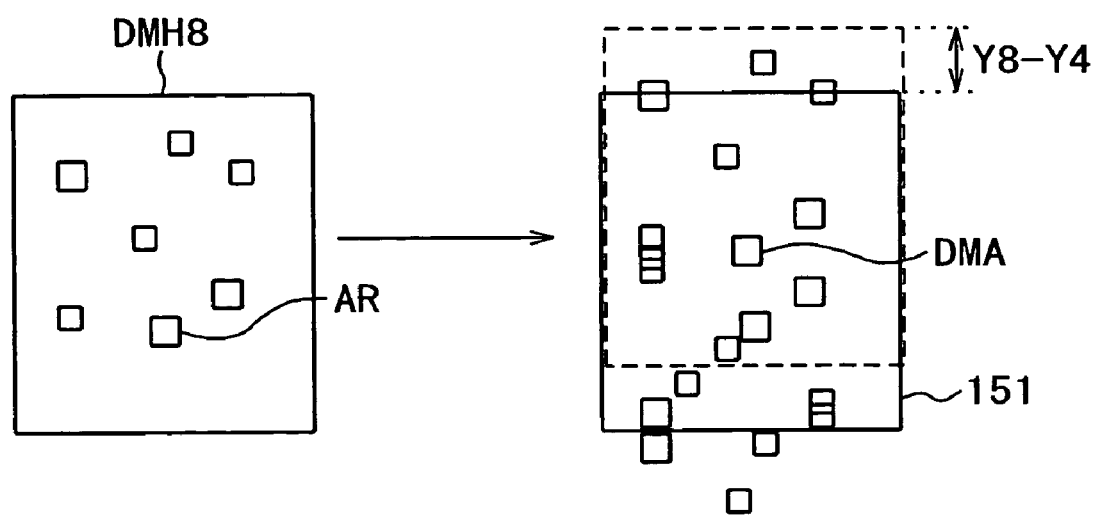
FIG. 38 is a schematic diagram illustrating the process to write data in the temporary memory into the summing memory.

In the process at Step S135 of the fingerprint collation program, the group of the degrees of coincidence DMH0 in the temporary memory is added to the data in the summing memory to sequentially update the data in the summing memory by means of addition. In this case, the summing memory has been cleared of its contents at Step S131, so that the fingerprint collation program causes transfer of the group of the degrees of coincidence DMH0 from the temporary memory to the cleared summing memory, as shown in FIG. 35.

Then, with the central one out of the nine lines of linear images of the horizontal direction registered data D1H0 to D1H8 as reference, the fingerprint collation program causes correction of the distance from this central linear image to each of the other linear images of the registered data D1H0 (i.e., shift the coordinates by (X0-X0, Y4-Y0) in FIG. 25) to write the data of the group of the degrees of coincidence DMH0 in the temporary memory into the summing memory.

In addition, in FIG. 35 to FIG. 38, the area AR set to the degree of coincidence equal or above the prescribed level at Step S134 is expressed in a rectangular shape. In FIG. 35 to FIG. 38, reference numeral 151 denotes a position corrected image corresponding to the degrees of coincidence DMH0 to DMH8 in the summing memory.

In the process at Step S136 of the fingerprint collation program, the variable n is incremented. In the process at Step S137 of the fingerprint collation program, it is determined that the variable n has surpassed a value of 9 or not. When it is determined that the variable n has not surpassed the value of 9, it means that the collation rate detection process with respect to the nine detected distributions of the degrees of coincidence for each of the horizontal direction registered data D1H0 to D1H8 is not completed. Thus, the procedure is returned to Step S123 to repeat the above processes for the following distribution of the degrees of coincidence DMH1.

As described above, according to the fingerprint collation program, the procedure sequence of Steps S123 to S136 are repeated to round the nine detected distributions of the degrees of coincidence for each of the horizontal direction registered data D1H0 to D1H8. Then, the rounded groups of the degrees of coincidence DMH0 to DMH8 are corrected with the respective distances from the central linear image (the horizontal direction registered data D1H4) and written into the temporary memory (See FIGS. 37 and 38).

The fingerprint collation program thereby sums up the distribution of the degrees of coincidence such that, if the linear images designated by the horizontal direction registered data D1H0 to D1H8 are essentially to coincide with the fingerprint image designated by the fingerprint data D2, the degrees of coincidence detected in the position where the fingerprint image designated by the fingerprint data D2 and each linear image precisely overlap each other are cumulatively summed up.

In other words, when the degrees of coincidence are to be detected by scanning the image designated by the fingerprint data D2 with linear images consisting of repetitions of alternate bright and dark parts, even if the linear images are essentially not to coincide with the fingerprint image designated by the fingerprint data D2, a high degree of coincidence may be detected in a plurality of portions on each linear image. Or, if the linear images are essentially to coincide with the fingerprint image designated by the fingerprint data D2, a high degree of coincidence is also detected elsewhere other than in the positions where the fingerprint image designated by the fingerprint data D2 and each linear image precisely overlap each other.

However, when the coordinates are corrected according to the positional relationship among the linear images, and the detected distributions of the degrees of coincidence are summed on that basis, it may be difficult to detect a high peak value among the above degrees of coincidence.

On the other hand, detection of a higher peak value (represented by code DMA in FIG. 38) is attainable, if the fingerprint image designated by the fingerprint data D2 is essentially to coincide with the linear images, in addition to a case where, with respect to the degrees of coincidence detected in the position where the fingerprint image designated by the fingerprint data D2 and each linear image precisely overlap each other, the coordinates are corrected according to the positional relationship among the linear images, and the detected distributions of the degrees of coincidence are summed up on that basis. On the basis of this principle, the fingerprint collation apparatus 1 according to a preferred embodiment of the present invention calculates the collation rate after detection of this peak value.

In other words, according to the fingerprint collation program, after having summed up the detected distributions of the degrees of coincidence for the nine lines of linear images in the horizontal direction, the procedure goes on to Step S138, where it is determined that summing of the detected distributions of the degrees of coincidence for the linear images in the vertical direction is completed or not. When it is determined that summing of the detected distributions of the degrees of coincidence for the linear images in the vertical direction is not completed, the procedure goes on to Step S139. In the process at Step S139 of the fingerprint collation program, an object of the process is switched to the detected degrees of coincidence for the linear images in the vertical direction, and the procedure is returned to Step S134 with the variable n reset to 0 to repeat the above processes, where the fingerprint collation program rounds the detected distributions of the degrees of coincidence DMV0 to DMV8 for the linear images in the vertical direction similarly to the round process for the linear images in the horizontal direction and to update the summing memory contact to sum up the detected distributions of the degrees of coincidence.

When it is determined at Step S138 that summing of the detected distributions of the degrees of coincidence for the linear images in the vertical direction is completed, the procedure goes on to Step S140, where the fingerprint collation program sequentially reads out the summing memory content and to detect the maximum DMA of the summed degrees of coincidence, and the collation rate detection process is completed. The fingerprint collation program sets the maximum DMA consisting of the peak value of the summing result to the collation rate N.

As described above, the fingerprint collation apparatus 1 according to the preferred embodiment of the present invention may perform the fingerprint collation.

The present invention is also applicable to determination of a contacting object other than the finger, such as an object having relatively fine patterns.

The above series of processes is executable by hardware, or alternatively, by software as well. In execution of the above series of processes by software, a program that configures the software may be installed from a recording medium into a computer incorporated in the hardware dedicated to the above processes or a general-purpose personal computer capable of executing various kinds of functions by installing corresponding programs.

The recording medium is by no means limited to packaged media distributed to provide a program to users, independently of a computer, in other words those with a program on, such as the magnetic disc 71 (inclusive of a flexible disc), the optical disc 72 (inclusive of Compact Disc-Read Only Memory (CD-ROM) and Digital Versatile Disc (DVD)), the magneto-optical disc 73 (inclusive of Mini-Disc (MD)(trade name)) and the semiconductor memory 74, as shown in FIG. 3. Alternatively, the recording medium may be also that provided for the user with being incorporated in a computer in advance, in other words, those with the program on, such as the RAM/ROM for program 53 and a hard disc.

The program for executing the above series of processes may be also installed into the computer over a wired or wireless communication medium such as local area network, Internet and digital satellite broadcasting systems through an interface such as modem and router, at need.

It is noted that the steps used for description of the program stored in the recording medium in the present specification are those including not only the processes executed in time series in the described sequences, but also the processes executed in parallel or individually without being always executed in time series.

It is therefore to be understood by those of ordinary skill in the art that any changes, variations, combinations and sub-combinations of the examples of preferred embodiments of the present invention may be practiced otherwise than as specifically described herein in the present specification without departing from the scope and spirit of the present invention.

What is claimed is:

1. A signal processing apparatus for processing data supplied from a sensor that outputs data of magnitude corresponding to respective capacitances of capacitors related to a plurality of sampling points formed by a touching object, said signal processing apparatus comprising:
- classifying means for classifying said data into patterns based on number of data having magnitude of a first threshold value or more, number of data having magnitude of a second threshold value or less and a difference between values obtained based on a maximum value and a minimum value of magnitude of said data; and
- determining means for determining said object touching said sensor, based on said classified patterns,
- wherein said difference comprises a value obtained by subtracting an average of said data within a second range having said minimum value of said data as a reference, from an average of said data within a first range having said maximum value of said data as a reference.

2. The signal processing apparatus according to claim 1, wherein said determining means determines whether said object is a finger or not.

3. The signal processing apparatus according to claim 2, wherein said first threshold value comprises a value corresponding to said capacitance of said capacitor relative to a convex portion of said finger.

4. The signal processing apparatus according to claim 2, wherein said second threshold value comprises a value corresponding to said capacitance of said capacitor relative to a concave portion of said finger.

5. The signal processing apparatus according to claim 1, wherein said determining means determines whether said data that has been classified into said patterns corresponds to respective capacitances of said capacitors related to a plurality of sampling points within a range that includes a portion of a detection area of said sensor.

6. The signal processing apparatus according to claim 1, wherein:
- said classifying means classifies each of said ranges within a plurality of said ranges into said patterns; and
- said determining means determines said object touching said sensor based on said patterns classified for each of said ranges.

7. A signal processing method for processing data supplied from a sensor that outputs data of magnitude corresponding to respective capacitances of capacitors related to a plurality of sampling points formed by a touching object, said signal processing method comprising the steps of:
- classifying said data into patterns based on number of data having magnitude of a first threshold value or more, number of data having magnitude of a second threshold value or less and a difference between values obtained based on a maximum value and a minimum value of magnitude of said data; and
- determining said object touching said sensor, based on said classified patterns,
- wherein said difference comprises a value obtained by subtracting an average of said data within a second range having said minimum value of said data as a reference, from an average of said data within a first range having said maximum value of said data as a reference.

8. A storage medium for storing a computer-readable program for causing a computer to execute the steps of a signal processing method- for processing data supplied from a sensor that outputs data of magnitude corresponding to respective capacitances of capacitors related to a plurality of sampling points formed by a touching object, said signal processing method comprising the steps of:
- classifying said data into patterns based on number of data having magnitude of a first threshold value or more, number of data having magnitude of a second threshold value or less and a difference between values obtained based on a maximum value and a minimum value of magnitude of said data; and
- determining said object touching said sensor, based on said classified patterns,
- wherein said difference comprises a value obtained by subtracting an average of said data within a second range having said minimum value of said data as a reference, from an average of said data within a first range having said maximum value of said data as a reference.

* * * * *